United States Patent
Bailey et al.

(10) Patent No.: US 9,477,079 B2
(45) Date of Patent: Oct. 25, 2016

(54) SYSTEMS, DEVICES, AND METHODS FOR WEARABLE HEADS-UP DISPLAYS

(71) Applicant: THALMIC LABS INC., Kitchener (CA)

(72) Inventors: Matthew Bailey, Kitchener (CA); Stefan Alexander, Elmira (CA)

(73) Assignee: THALMIC LABS INC., Kitchener (CA)

( * ) Notice: Subject to any disclaimer, the term of this patent is extended or adjusted under 35 U.S.C. 154(b) by 0 days.

(21) Appl. No.: 14/749,341

(22) Filed: Jun. 24, 2015

(65) Prior Publication Data

US 2015/0378164 A1   Dec. 31, 2015

Related U.S. Application Data

(60) Provisional application No. 62/017,089, filed on Jun. 25, 2014, provisional application No. 62/053,598, filed on Sep. 22, 2014, provisional application No. 62/117,316, filed on Feb. 17, 2015.

(51) Int. Cl.
| | |
|---|---|
| *H05K 3/30* | (2006.01) |
| *G02B 26/10* | (2006.01) |
| *G02B 27/30* | (2006.01) |
| *G02B 27/01* | (2006.01) |

(52) U.S. Cl.
CPC ............ *G02B 26/10* (2013.01); *G02B 27/017* (2013.01); *G02B 27/0176* (2013.01); *G02B 27/30* (2013.01); *G02B 2027/015* (2013.01); *G02B 2027/0154* (2013.01); *G02B 2027/0178* (2013.01); *G02B 2027/0187* (2013.01)

(58) Field of Classification Search
CPC ............... G02F 1/1309; G02F 1/1336; G02F 1/133528; G02F 1/13338; G02F 1/1303; G02F 1/1345; G02F 2001/133354
See application file for complete search history.

(56) References Cited

U.S. PATENT DOCUMENTS

| | | | | |
|---|---|---|---|---|
| 2014/0320532 | A1* | 10/2014 | Kim | ........................ G02B 27/017 345/633 |
| 2015/0029868 | A1* | 1/2015 | Mahasenan | .............. H04L 41/12 370/242 |
| 2015/0168727 | A1* | 6/2015 | Qaddoura | ........... G02B 27/0172 345/156 |
| 2015/0317956 | A1* | 11/2015 | Lection | ..................... G09G 5/38 345/633 |

* cited by examiner

*Primary Examiner* — Tracie Y Green
(74) *Attorney, Agent, or Firm* — Seed IP Law Group LLP

(57) ABSTRACT

Systems, devices, and methods for transparent displays that are well-suited for use in wearable heads-up displays are described. Such transparent displays include a register of light-emitting diodes that sequentially generates pixels or other discrete portions of an image. Respective sets of light signals corresponding to the respective portions (e.g., rows) of the image are sequentially directed into the user's field of view by a combination of a dynamic reflector and a set of static light-redirection elements. The dynamic reflector is an elongated reflective strip (including, for example, one or more MEMS-based digital micromirror(s)) mounted outside of the field of view of the user and the set of static light-redirection elements are substantially transparent and mounted directly in a field of view of the user. Successive portions of the image are generated in rapid succession until the entire image is displayed to the user.

19 Claims, 12 Drawing Sheets

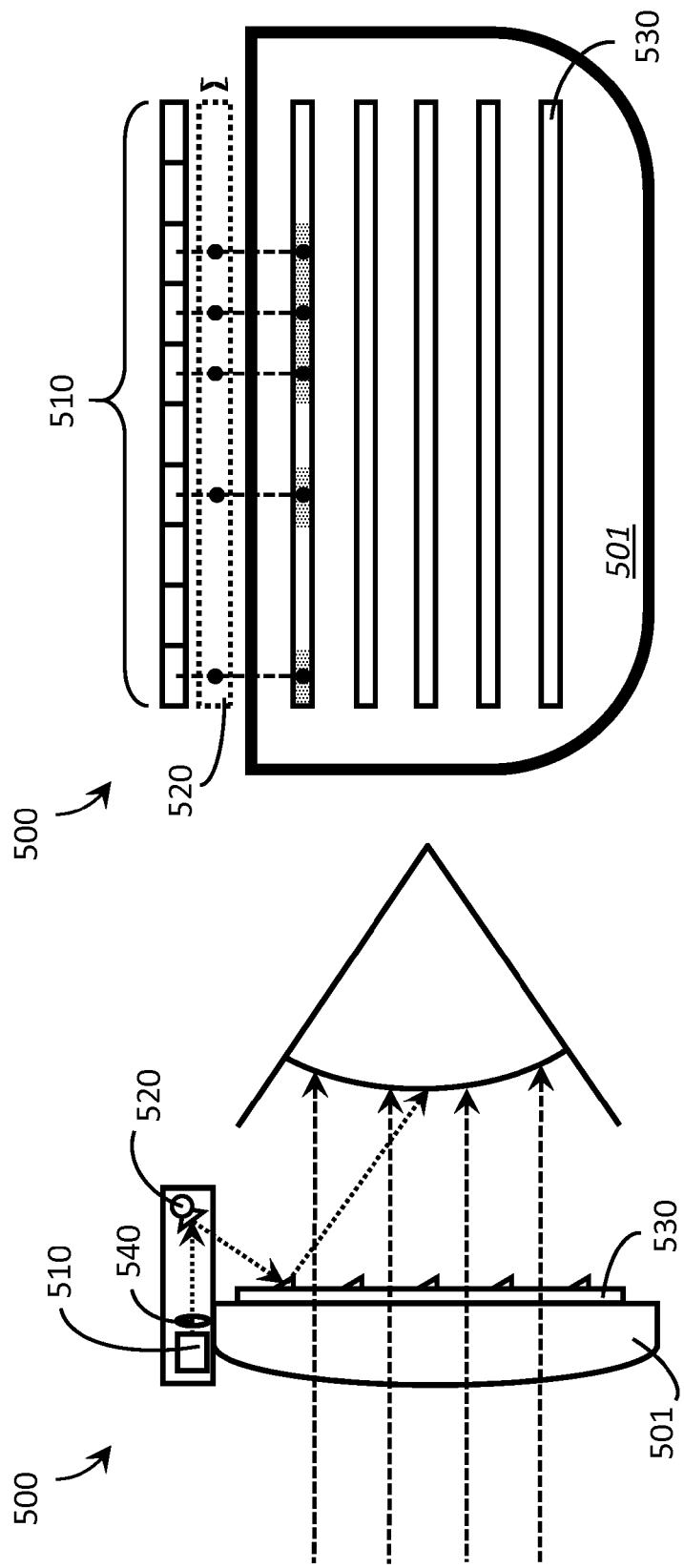

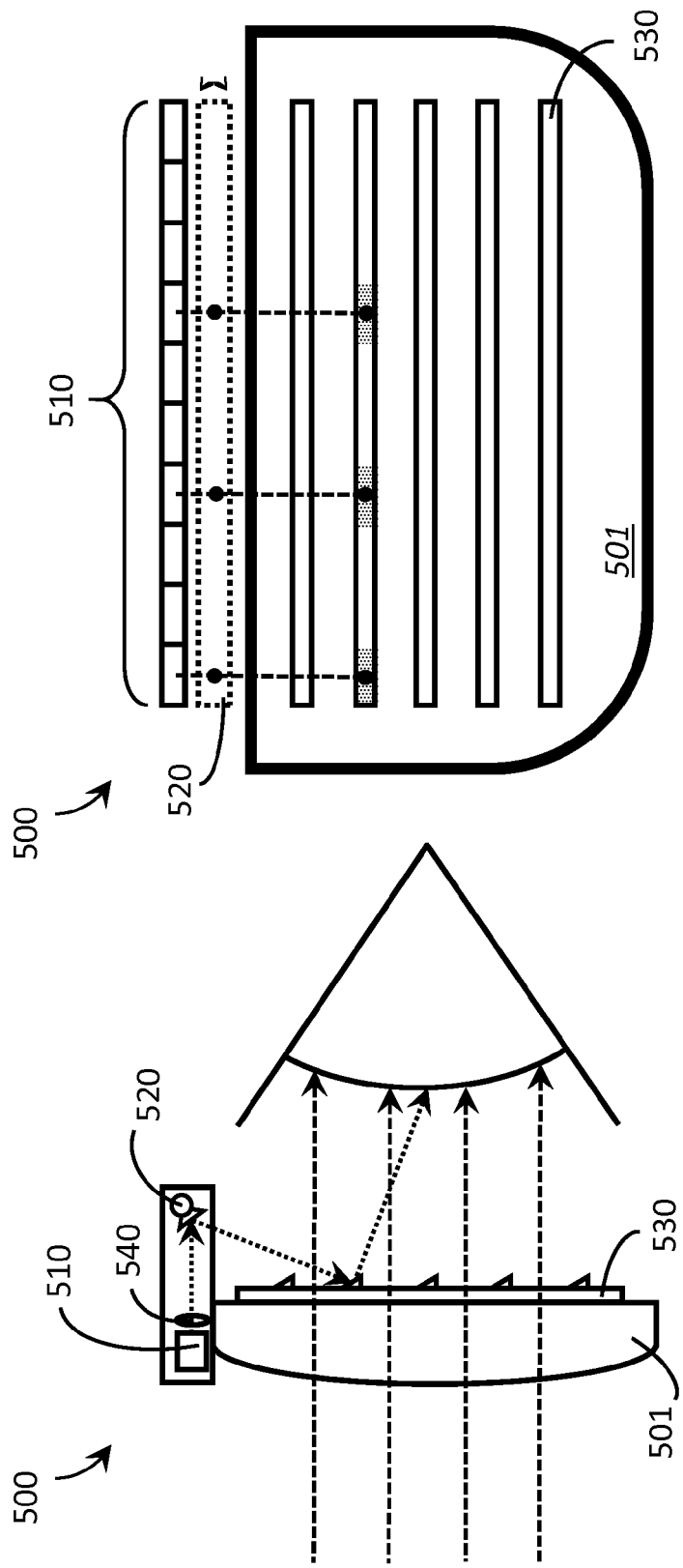

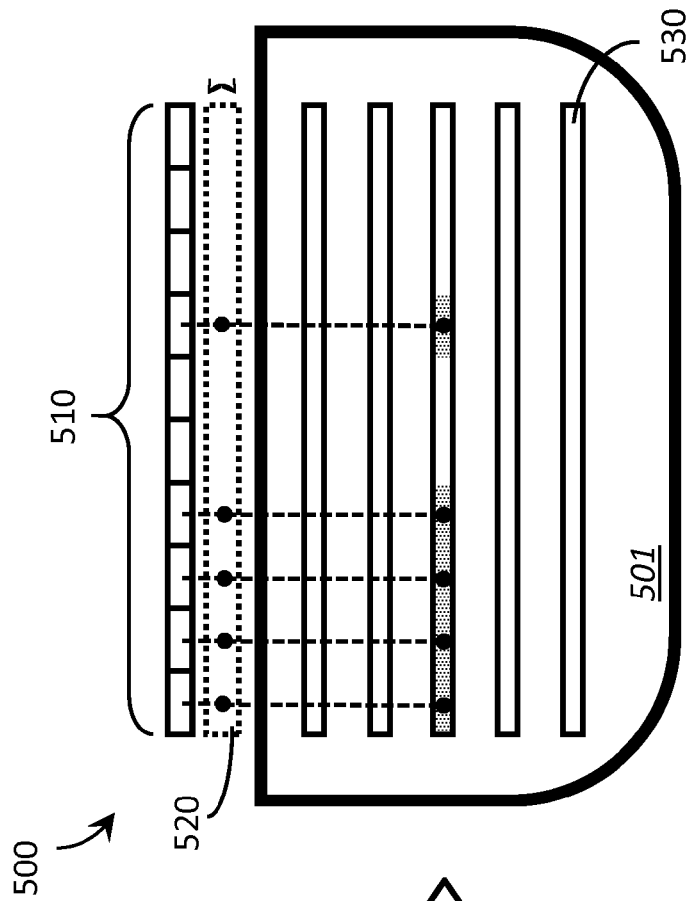
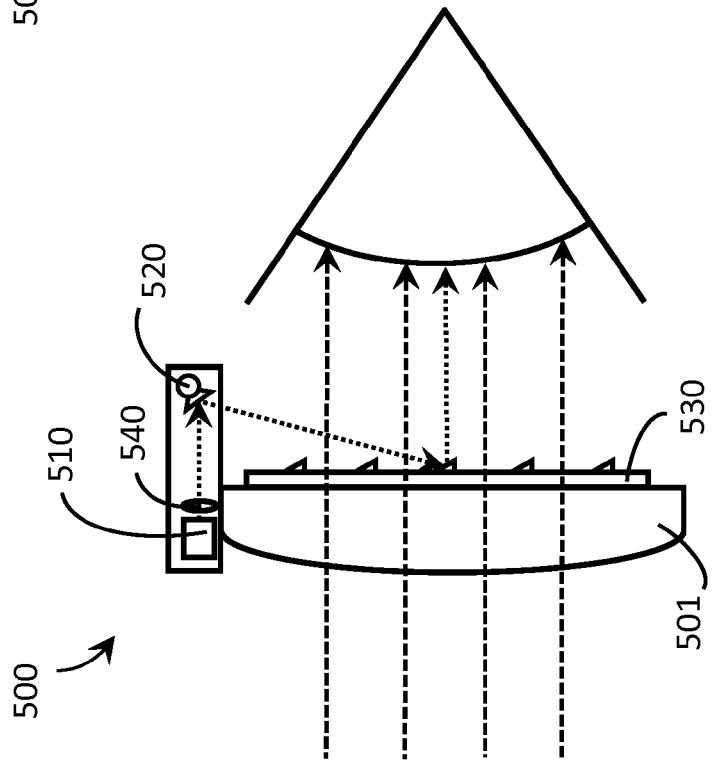
FIGURE 5F
FIGURE 5E

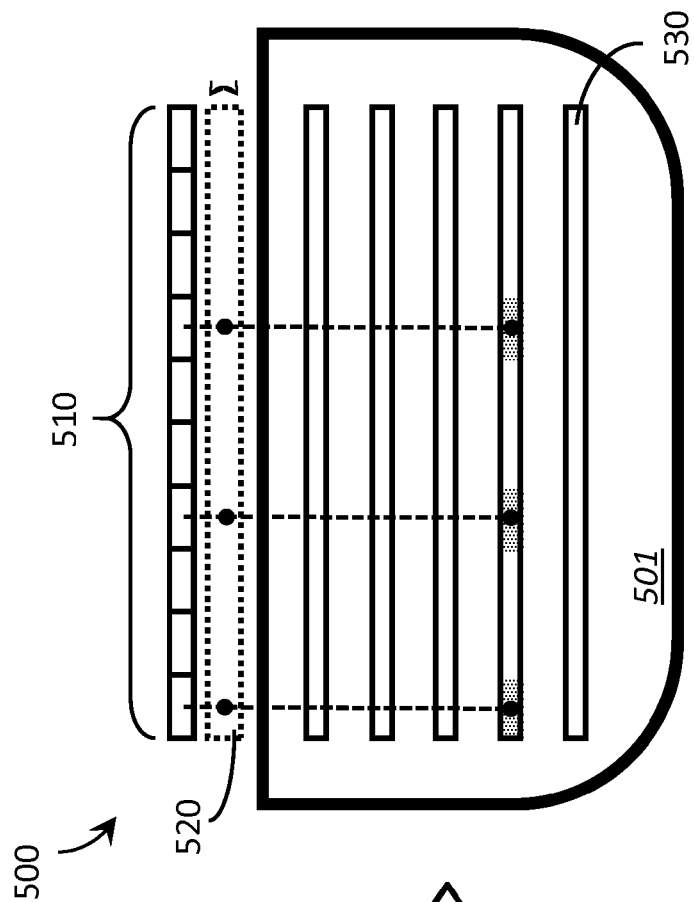
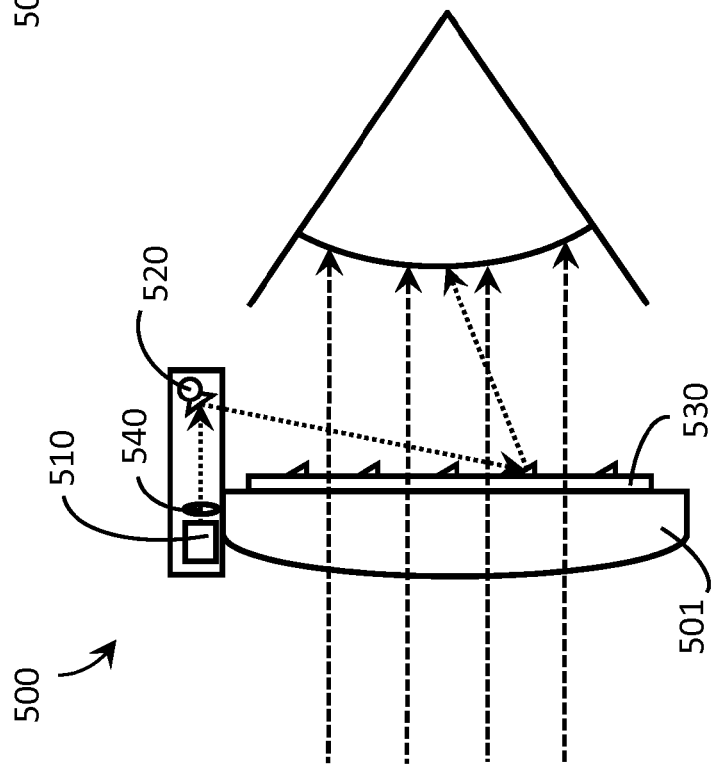

SYSTEMS, DEVICES, AND METHODS FOR WEARABLE HEADS-UP DISPLAYS

BACKGROUND

1. Technical Field

The present systems, devices, and methods generally relate to electronic display technologies and particularly relate to electronic display technologies that are well-suited for use in wearable heads-up displays.

2. Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wearable Heads-Up Displays

While wearable electronic devices may be carried and, at least to some extent, operated by a user without encumbering the user's hands, many wearable electronic devices include at least one electronic display. Typically, in order for the user to access (i.e., see) and interact with content presented on such electronic displays, the user must modify their posture to position the electronic display in their field of view (e.g., in the case of a wristwatch, the user may twist their arm and raise their wrist towards their head) and direct their attention away from their external environment towards the electronic display (e.g., look down at the wrist bearing the wristwatch). Thus, even though the wearable nature of a wearable electronic device allows the user to carry and, to at least some extent, operate the device without occupying their hands, accessing and/or interacting with content presented on an electronic display of a wearable electronic device may occupy the user's visual attention and limit their ability to perform other tasks at the same time.

The limitation of wearable electronic devices having electronic displays described above may be overcome by wearable heads-up displays. A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

A challenge in the design of most wearable heads-up display devices is the need to provide focused, high-quality images to the user without limiting the user's ability to see their external environment, and while at the same time minimizing the bulk of the wearable heads-up display unit itself. All of the wearable heads-up display devices available today are noticeably bulkier than a typical pair of corrective eyeglasses or sunglasses and there remains a need in the art for electronic display technology that enables wearable heads-up display devices of more aesthetically-appealing design while simultaneously providing high-quality images to the user without limiting the user's ability to see their external environment.

BRIEF SUMMARY

A wearable heads-up display may be summarized as including: a support structure that in use is worn on a head of a user; a transparent element that is physically coupled to the support structure, wherein the transparent element is positioned within a field of view of the user when the support structure is worn on the head of the user; a light source physically coupled to the support structure and positioned near or beyond a periphery of the field of view of the user when the support structure is worn on the head of the user; a dynamic reflector physically coupled to the support structure and positioned to receive light signals provided by the light source, wherein the dynamic reflector is controllably variable to reflect the light signals provided by the light source towards select regions of the transparent element; and a set of static light-redirection elements, each static light-redirection element in the set of static light-redirection elements positioned on or proximate the transparent element in the field of view of the user when the support structure is worn on the head of the user, wherein in use at least one static light-redirection element in the set of static light-redirection elements receives a light signal reflected by the dynamic reflector and redirects the light signal towards at least one eye of the user.

The light source may include a register of light-emitting diodes. The dynamic reflector may include an elongated reflective bar that is controllably rotatable about an axis that is parallel to or collinear with a longitudinal axis thereof, and the elongated reflective bar may be positioned to receive a respective light signal provided by each respective light-emitting diode in the register of light-emitting diodes and reflect the respective light signal provided by each respective light-emitting diode in the register of light-emitting diodes towards a region of the transparent element that is dependent on a rotational orientation of the elongated reflective bar.

The light source may include at least one laser. The dynamic reflector may be controllably rotatable about at least two axes.

The wearable heads-up display may further include at least one collimator positioned in between the light source and the dynamic reflector, wherein a light signal provided by the light source passes through the at least one collimator before receipt by the dynamic reflector. The transparent element may include a prescription eyeglass lens. Each static light-redirection element in the set of static light-redirection elements may include a respective thin-film element that is affixed to the transparent element. Each static light-redirection element in the set of static light redirection elements may be selected from the group consisting of: a prismatic structure, a prismatic film, a refractive element, a reflector, a parabolic reflector, and a holographic optical element.

The transparent element may be positioned within a field of view of a first eye of the user when the support structure is worn on the head of the user, and the wearable heads-up display may further include: a second transparent element physically coupled to the support structure, wherein the second transparent element is positioned within a field of view of a second eye of the user when the support structure is worn on the head of the user; a second light source physically coupled to the support structure and positioned near or beyond a periphery of the field of view of the second eye of the user when the support structure is worn on the head of the user; a second dynamic reflector physically coupled to the support structure and positioned to receive light signals provided by the second light source, wherein the second dynamic reflector is controllably variable to reflect the light signals provided by the second light source towards select regions of the second transparent element; and a second set of static light-redirection elements, each static light-redirection element in the second set of static light-redirection elements positioned on or proximate the second transparent element in the field of view of the second eye of the user when the support structure is worn on the head of the user, wherein in use at least one static light-redirection element in the second set of static light-redirection elements receives a light signal reflected by the second dynamic reflector and redirects the light signal towards the second eye of the user. The support structure may have a general shape and appearance of an eyeglasses frame.

The wearable heads-up display may further include: a processor physically coupled to the support structure and communicatively coupled to both the light source and the dynamic reflector; and a non-transitory processor-readable storage medium physically coupled to the support structure and communicatively coupled to the processor, wherein the non-transitory processor-readable storage medium stores processor-executable instructions that, when executed by the processor, cause the processor to: control the light signals provided by the light source; and control the dynamic reflector to reflect the light signals provided by the light source towards select regions of the transparent element.

A method of operating a wearable heads-up display when the wearable heads-up display is worn on a head of a user, the wearable heads-up display including a transparent element positioned in a field of view of the user, at least one light source positioned substantially outside of the field of view of the user, a dynamic reflector positioned outside of the field of view of the user, and a set of static light-redirection elements positioned on or proximate the transparent element and within the field of view of the user, may be summarized as including: orienting the dynamic reflector in a first rotational orientation; generating a first light signal representative of at least a first portion of an image by the light source; reflecting the first light signal towards a first static light-redirection element in the set of static light-redirection elements by the dynamic reflector, the first static light-redirection element determined by the first rotational orientation of the dynamic reflector; and redirecting the first light signal towards an eye of the user by the first static light-redirection element.

The method may further include: orienting the dynamic reflector in a second rotational orientation; generating a second light signal representative of a second portion of the image by the light source; reflecting the second light signal towards a second static light-redirection element in the set of static light-redirection elements by the dynamic reflector, the second static light-redirection element determined by the second rotational orientation of the dynamic reflector; and redirecting the second light signal towards the eye of the user by the second static light-redirection element. The image may include N portions, where N is an integer greater than 2, and the method may further include: until i=(N+1), where i is an integer with an initial value of 3, sequentially: orienting the dynamic reflector in an $i^{th}$ rotational orientation; generating an $i^{th}$ light signal representative of an $i^{th}$ portion of the image by the light source; reflecting the $i^{th}$ light signal towards an $i^{th}$ static light-redirection element in the set of static light-redirection elements by the dynamic reflector, the $i^{th}$ static light-redirection element determined by the $i^{th}$ rotational orientation of the dynamic reflector; redirecting the $i^{th}$ light signal towards the eye of the user by the $i^{th}$ static light-redirection element; and incrementing i by 1.

The method may include collimating the first light signal by at least one collimator. The wearable heads-up display may include a processor communicatively coupled to the light source and to the dynamic reflector and a non-transitory processor-readable storage medium communicatively coupled to the processor, the non-transitory processor-readable storage medium storing processor-executable instructions, and the method may further include executing the processor-executable instructions by the processor to: cause the processor to instruct the light source to generate the first light signal representative of at least a first portion of the image; and cause the processor to instruct the dynamic reflector to adopt the first rotational orientation.

A wearable heads-up display may be summarized as including: a support structure that in use is worn on a head of a user; a transparent element that is physically coupled to the support structure, wherein the transparent element is positioned within a field of view of the user when the support structure is worn on the head of the user; a light source physically coupled to the support structure and positioned near or beyond a periphery of the field of view of the user when the support structure is worn on the head of the user, the light source comprising a register of light-emitting diodes; a dynamic reflector physically coupled to the support structure and positioned to receive light signals provided by the light source, wherein the dynamic reflector is controllably variable to reflect the light signals provided by the light source towards select regions of the transparent element, the dynamic reflector comprising an elongated reflective strip that is controllably rotatable about an axis that is parallel to or collinear with a longitudinal axis thereof, and wherein the elongated reflective strip is positioned to receive a respective light signal provided by each respective light-emitting diode in the register of light-emitting diodes and reflect the respective light signal provided by each respective light-emitting diode in the register of light-emitting diodes towards a select region of the transparent element that is dependent on a rotational orientation of the elongated reflective strip; and a set of static light-redirection elements, each static light-redirection element in the set of static light-redirection elements positioned on or proximate the transparent element in the field of view of the user when the support structure is worn on the head of the user, wherein in use at least one static light-redirection element in the set of static light-redirection elements receives a light signal reflected by the dynamic reflector and redirects the light signal towards at least one eye of the user.

The wearable heads-up display may include at least one collimator positioned in between the light source and the dynamic reflector, wherein a light signal provided by the light source passes through the at least one collimator before receipt by the dynamic reflector. The transparent element may include a prescription eyeglass lens. Each static light-redirection element in the set of static light-redirection elements may include a respective portion of at least one thin-film element that is affixed to the transparent element. Each static light-redirection element in the set of static light redirection elements may be selected from the group consisting of: a prismatic structure, a prismatic film, a refractive element, a reflector, a parabolic reflector, and a holographic optical element.

The transparent element may be positioned within a field of view of a first eye of the user when the support structure is worn on the head of the user, and the wearable heads-up display may further include: a second transparent element physically coupled to the support structure, wherein the second transparent element is positioned within a field of view of the user when the support structure is worn on the head of the user; a second light source physically coupled to the support structure and positioned near or beyond a periphery of the field of view of the user when the support structure is worn on the head of the user, the second light source comprising a second register of light-emitting diodes; a second dynamic reflector physically coupled to the support structure and positioned to receive light signals provided by the second light source, wherein the second dynamic reflector is controllably variable to reflect the light signals provided by the second light source towards select regions of the second transparent element, the second dynamic reflector comprising a second elongated reflective strip that is controllably rotatable about an axis that is parallel to or collinear with a longitudinal axis thereof, and wherein the second elongated reflective strip is positioned to receive a respective light signal provided by each respective light-emitting diode in the second register of light-emitting diodes and reflect the respective light signal provided by each respective light-emitting diode in the second register of light-emitting diodes towards a select region of the second transparent element that is dependent on a rotational orientation of the second elongated reflective strip; and a second set of static light-redirection elements, each static light-redirection element in the second set of static light-redirection elements positioned on or proximate the second transparent element in the field of view of the user when the support structure is worn on the head of the user, wherein in use at least one static light-redirection element in the second set of static light-redirection elements receives a light signal reflected by the second dynamic reflector and redirects the light signal towards at least one eye of the user.

The support structure may have a general shape and appearance of an eyeglasses frame. The wearable heads-up display may further include: a processor physically coupled to the support structure and communicatively coupled to both the light source and the dynamic reflector; and a non-transitory processor-readable storage medium physically coupled to the support structure and communicatively coupled to the processor, wherein the non-transitory processor-readable storage medium stores processor-executable instructions that, when executed by the processor, cause the processor to: control the light signals provided by the light source; and control the dynamic reflector to reflect the light signals provided by the light source towards select regions of the transparent element.

The dynamic reflector may be positioned substantially out-of-plane with respect to the transparent element and may be controllably variable to reflect the light signals provided by the light source directly towards select regions of transparent element without traversing through any portion of the transparent element. Each static light-redirection element in the set of static light-redirection elements may include a respective static reflector that receives light signals reflected by the dynamic reflector and reflects the light signals towards at least one eye of the user.

The dynamic reflector may be positioned substantially in-plane with respect to the transparent element and may be controllably variable to reflect the light signals provided by the light source into a volume of the transparent element, each light signal totally internally reflected within the transparent element until the light signal impinges on a region of an inner surface of the transparent element that aligns with a corresponding static light-redirection element on an outer surface of the transparent element. Each static light-redirection element in the set of static light-redirection elements may include a respective static refractor that receives light signals totally internally reflected within the transparent element and refracts the light signals towards at least one eye of the user.

The dynamic reflector may include a single elongated reflective bar-like micromirror that is controllably rotatable in one rotational dimension about an axis that is parallel to or collinear with a longitudinal axis thereof. Alternatively, the dynamic reflector may include a register of individual micromirror devices arranged in a strip and each controllably rotatable about a shared axis that is parallel to or collinear with the longitudinal axes thereof.

A method of operating a wearable heads-up display when the wearable heads-up display is worn on a head of a user, the wearable heads-up display including a transparent element positioned in a field of view of the user, a light source comprising a register of light-emitting diodes positioned substantially outside of the field of view of the user, a dynamic reflector comprising an elongated reflective strip that is controllably rotatable about an axis that is parallel to or collinear with a longitudinal axis thereof and positioned outside of the field of view of the user, and a set of static light-redirection elements positioned on or proximate the transparent element and within the field of view of the user, may be summarized as including: orienting the elongated reflective strip in a first rotational orientation; generating a first set of light signals representative of at least a first portion of an image by the register of light-emitting diodes; reflecting the first set of light signals towards a first subset of static light-redirection elements in the set of static light-redirection elements by the elongated reflective strip, the first subset of static light-redirection elements determined by the first rotational orientation of the elongated reflective strip; and redirecting the first set of light signals towards an eye of the user by the first subset of static light-redirection elements.

The method may further include: orienting the elongated reflective strip in a second rotational orientation; generating a second set of light signals representative of a second portion of the image by the register of light-emitting diodes; reflecting the second set of light signals towards a second subset of static light-redirection elements in the set of static light-redirection elements by the elongated reflective strip, the second subset of static light-redirection elements determined by the second rotational orientation of the elongated reflective strip; and redirecting the second set of light signals towards the eye of the user by the second subset of static light-redirection elements. The image may include N portions, where N is an integer greater than 2, and the method may further include: until i=(N+1), where i is an integer with an initial value of 3, sequentially: orienting the elongated reflective strip in an $i^{th}$ rotational orientation; generating an $i^{th}$ set of light signals representative of an $i^{th}$ portion of the image by the register of light-emitting diodes; reflecting the $i^{th}$ set of light signals towards an $i^{th}$ subset of static light-redirection elements in the set of static light-redirection elements by the elongated reflective strip, the $i^{th}$ subset of static light-redirection elements determined by the $i^{th}$ rotational orientation of the elongated reflective strip;

redirecting the $i^{th}$ set of light signals towards the eye of the user by the $i^{th}$ subset of static light-redirection elements; and incrementing i by 1.

The method may include collimating the first set of light signals by at least one collimator. The wearable heads-up display may include a processor communicatively coupled to the register of light-emitting diodes and to the elongated reflective strip, and a non-transitory processor-readable storage medium communicatively coupled to the processor, the non-transitory processor-readable storage medium storing processor-executable instructions, and the method may further include executing the processor-executable instructions by the processor to: cause the processor to instruct the register of light-emitting diodes to generate the first set of light signals representative of at least a first portion of the image; and cause the processor to instruct the elongated reflective strip to adopt the first rotational orientation.

The elongated reflective strip may be positioned substantially out-of-plane with respect to the transparent element and each static light-redirection element in the set of static light-redirection elements may include a respective static reflector. In this case: reflecting the first set of light signals towards a first subset of static light-redirection elements in the set of static light-redirection elements by the elongated reflective strip may include reflecting the first set light signals directly towards the first subset of static reflectors by the elongated reflective strip without causing the first set of light signals to traverse through any portion of the transparent element; and redirecting the first set of light signals towards an eye of the user by the first subset of static light-redirection elements may include reflecting the first set of light signals towards at least one eye of the user by the set of static reflectors.

The elongated reflective strip may be positioned substantially in-plane with respect to the transparent element and each static light-redirection element in the set of static light-redirection elements comprises a respective static refractor. In this case: reflecting the first set of light signals towards a first subset of static light-redirection elements in the set of static light-redirection elements by the elongated reflective strip may include reflecting the first set of light signals into a volume of the transparent element and totally internally reflecting the first set of light signals within the volume of the transparent element until the first set of light signals impinge on a region of an inner surface of the transparent element that aligns with at least one corresponding static refractor on an outer surface of the transparent element; and redirecting the first set of light signals towards an eye of the user by the first subset of static light-redirection elements may include refracting the first set of light signals towards at least one eye of the user by the set of static refractors.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 5A is an illustrative diagram showing a side view of a wearable heads-up display in a first stage of an exemplary use in accordance with the present systems, devices, and methods.

FIG. 5B is an illustrative diagram showing a front view of a wearable heads-up display in the first stage of the exemplary use in accordance with the present systems, devices, and methods.

FIG. 5C is an illustrative diagram showing a side view of a wearable heads-up display in a second stage of the exemplary use in accordance with the present systems, devices, and methods.

FIG. 5D is an illustrative diagram showing a front view of a wearable heads-up display in the second stage of the exemplary use in accordance with the present systems, devices, and methods.

FIG. 5E is an illustrative diagram showing a side view of a wearable heads-up display in a third stage of the exemplary use in accordance with the present systems, devices, and methods.

FIG. 5F is an illustrative diagram showing a front view of a wearable heads-up display in the third stage of the exemplary use in accordance with the present systems, devices, and methods.

FIG. 5G is an illustrative diagram showing a side view of a wearable heads-up display in a fourth stage of the exemplary use in accordance with the present systems, devices, and methods.

FIG. 5H is an illustrative diagram showing a front view of a wearable heads-up display in the fourth stage of the exemplary use in accordance with the present systems, devices, and methods.

DETAILED DESCRIPTION

Figure 1:
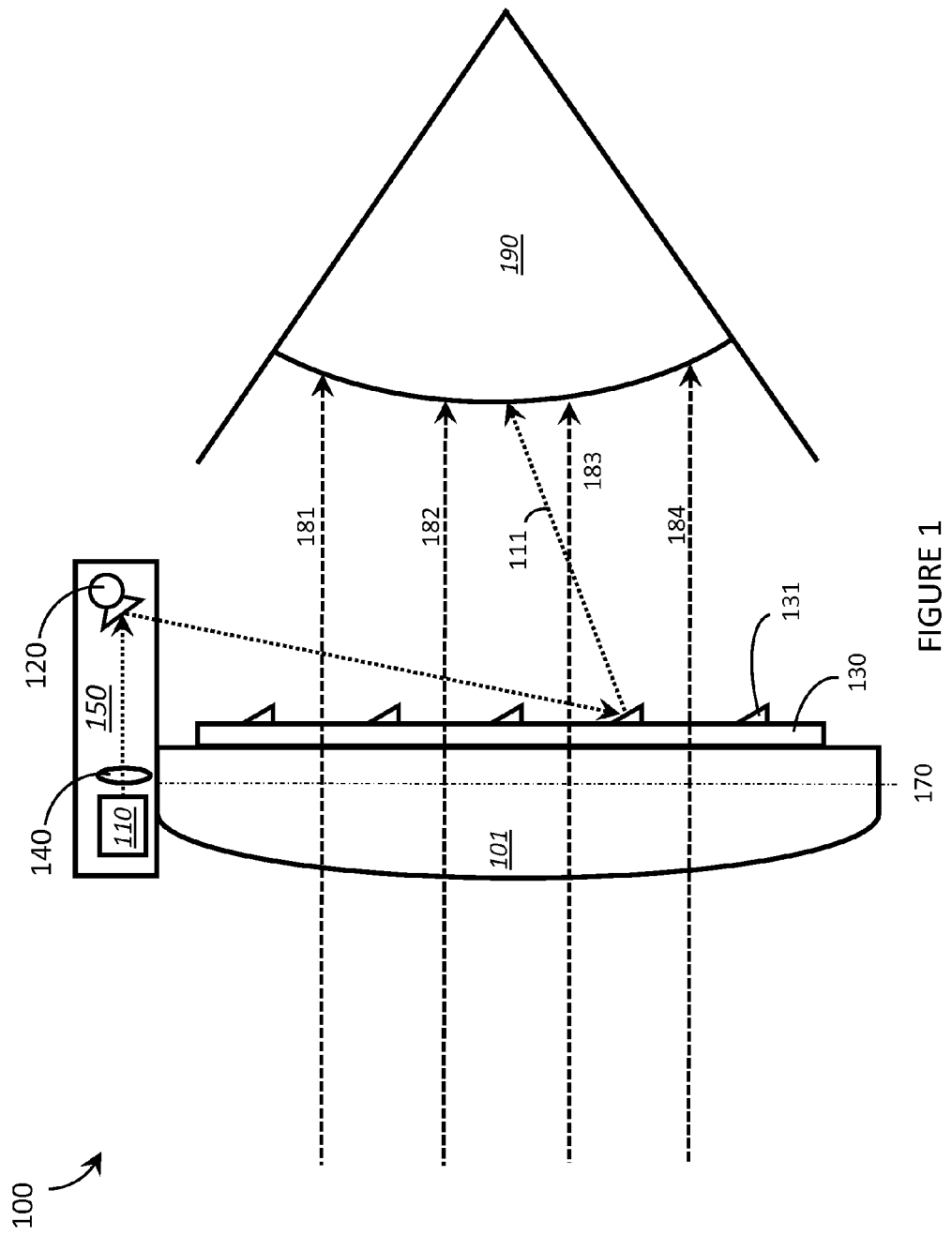
FIG. 1 is an illustrative diagram showing a side view of a wearable heads-up display in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for wearable heads-up displays that are at least partially transparent. The wearable heads-up displays described herein are significantly less bulky and less massive than other wearable heads-up displays available today.

Various wearable heads-up displays described herein each employ at least three components: at least one light-emitting element (e.g., a "light source," "laser source," "laser", "light emitting diode(s)") that produces (e.g., generates and/or emits) an image in portions at a time (e.g., on a pixel-by- pixel basis, a row-by-row basis, or a column-by-column basis), at least one controllably rotatable reflector (e.g., a "dynamic reflector"); and at least one light-redirection element (e.g., a "reflector," a "refractor," a "diffractor," "mirror," "half silvered mirror," "dichroic filter," "prism," "optic"). Together, these three components scan light emitted by the light source over the user's eye to produce an image seen by the user. In the present systems, devices, and methods, the at least one dynamic reflector is placed outside of the user's field of view and the at least one static light-redirection element is placed directly in the user's field of view, either on or at least proximate a transparent element of the wearable heads-up display such that the user may simultaneously see light from the external environment and light from the static light-redirection elements of the wearable heads-up display.

Throughout this specification and the appended claims, reference is often made to a "transparent element" of a wearable heads-up display. As described in more detail later on, the wearable heads-up displays of the present systems, devices, and methods may be sized and dimensioned similar to (or otherwise have the general shape and appearance of) a pair of eyeglasses or sunglasses. In some embodiments, elements of the wearable heads-up display devices described herein may even be added to an existing pair of eyeglasses or sunglasses in order to convert the existing pair of eyeglasses or sunglasses into a wearable heads-up display as described herein. Accordingly, a "transparent element" of the wearable heads-up displays described herein may resemble or literally be a lens from a pair of eyeglasses or sunglasses, including but not limited to a prescription lens. Throughout the remainder of this description, the term "lens" is generally used to refer to such a "transparent element," though a person of skill in the art will appreciate that the transparent element(s) of the present systems, devices, and methods may take other "non-lens" forms in some implementations. For example, in some implementations a transparent element may be better characterized as a window having no substantial optical power or "lensing" effect on light transmitted therethrough. Furthermore, the term "transparent" should be interpreted generally as "substantially transparent" and does not limit the present systems, devices, and methods to lenses and transparent elements having 100% transparency.

Throughout this specification and the appended claims, the term "static" is often used to describe one or more reflector(s)/refractor(s). Unless the specific context requires otherwise, the term 'static" is used to indicate that the corresponding reflector/refractor is substantially fixed in place relative to the wearable heads-up display and not controllable, movable, rotatable, etc. In other words, a static reflector/refractor is a passive element (discrete, mechanical, prismatic, holographic, or otherwise) that is fixed (during operation) in position, rotation, and orientation. The term static is used to distinguish such elements from active elements of a wearable heads-up display that are dynamically controllable, movable, rotatable, deformable, etc. (such as a "dynamic" reflector). Thus, the term "dynamic" is used herein to describe a reflector that is controllably variable (either rigidly of flexibly, e.g., by deformation) in at least one of its position, its rotation, and/or its orientation with respect to light signals that are incident thereon. A digital micromirror, such as a MEMS-based micromirror, is an example of a dynamic reflector that may be used in accordance with the present systems, devices, and methods.

A person of skill in the art will appreciate that, in general, one or more reflective element(s) may be replaced by one or more refractive element(s) and/or one or more diffractive element(s), and vice versa, with some re-alignment of the optical path sometimes necessary, to achieve the same final end trajectory of a light signal. Unless the specific context requires otherwise, the terms "reflector" and "refractor" should generally be construed as non-limiting examples that may be interchanged without undue burden or experimentation. To support this interchangeability, the term "static light-redirection element" is used in the claims to encompass static reflectors, static refractors, static diffractors, and combinations thereof.

FIG. 1 is an illustrative diagram showing a side view of a wearable heads-up display 100 in accordance with the present systems, devices, and methods. Display 100 includes a lens (i.e., a "transparent element) 101 physically coupled to a support structure 150. In use, support structure 150 is worn on a head of a user so that lens 101 is positioned in front of and within a field of view of at least one eye 190 of the user. The combination of support structure 150 and lens 101 may resemble, or may literally be, a pair of eyeglasses or sunglasses. Support structure 150 carries (e.g., on a frame portion thereof at a perimeter of lens 101 or on an arm portion thereof that extends, for example, towards and over an ear of the user) a first light source 110. In use, light source 110 generates and emits one or more light signal(s) (or sets of light signals) 111 that represent an image (or respective portion(s) of an image). Light signal 111 is projected from light source 110 towards, and received by, a dynamic reflector 120 that is also carried by support structure 150 (also either on a frame portion thereof proximate a perimeter of lens 101 or on an arm portion thereof that extends, for example, towards and over an ear of the user). Dynamic reflector 120 reflects light signal 111 towards lens 101. Either on or proximate lens 101, display 100 includes a set of static light-redirection elements in the form of static reflectors 131. In the illustrated example of FIG. 1, set of static reflectors 131 comprises a thin film 130 that is affixed directly to a surface of lens 101, and each individual static reflector 131 comprises a respective portion or discrete element of thin film 130, such as a prismatic reflector, a parabolic reflector, or a holographic optical element. Unless the specific context requires otherwise, a "set of static reflectors" may comprise multiple discrete elements or one or more region(s)/area(s) of a single continuous element. For example, in the case of thin film 130, a set of static reflectors 131 may comprise areas or regions of film 130 that are operative to redirect light signals 111 in an engineered and predictable way. In accordance with the present systems, devices, and methods, dynamic reflector 120 selectively (i.e., controllably) reflects light signal 111 towards a particular one of static reflectors 131 depending on the specific portion or aspect of an image to which light signal 111 corresponds. In this way, light source 110 generates discrete portions or aspects of an image and the combination of dynamic reflector 120 and static reflectors 130 scans the discrete portions or aspects over the user's eye 190 to produce the complete image. In the illustrated example of FIG. 1, display 100 also includes a collimator 140 carried by support structure 150 and positioned in between light source 110 and dynamic reflector 120 so that light signal 111 passes through collimator 140 and is collimated thereby. FIG. 1 also depicts environment light 181, 182, 183, and 184 passing through lens 101 unaffected by film 130 and/or static reflectors 131 into the user's eye 190.

In the illustrated example of FIG. 1, lens 101 is substantially planar in geometry. Throughout this specification and the appended claims, various lenses and/or transparent elements are referred to as being "planar" and/or "having a plane." Unless the specific context requires otherwise, the terms "planar" and "plane" are used herein in reference to lenses and/or transparent elements in a general sense to describe a geometry that is substantially larger in two spatial dimensions (e.g., length and width) than it is in a third spatial dimension (e.g., thickness) but is not intended to limit such geometries to being flat or without curvature. A person of skill in the art will appreciate that a lens in a pair of eyeglasses may generally be characterized as "having a plane" despite such a lens typically having obvious curvature. In FIG. 1, an approximation of the "plane" of lens 101 is represented by vertical dashed line 170. For the purposes of the present systems, devices, and methods, an object or point in space is said to be "in-plane" with respect to a lens or transparent element if an extension of the lens or transparent element along either of its two larger dimensions (e.g., along either its length or its width, as opposed to along its thickness) would cause the lens to contact or traverse the object or point in space. Under this definition, it is clear that dynamic reflector 120 is out-of-plane with respect to lens 101 in wearable heads-up display 100.

In exemplary display 100, static reflectors 131 are fixed in place and designed to reflect light signals 111 received from dynamic reflector 120 (each specific static reflector 131 being selected by a respective rotational orientation of dynamic reflector 120) into the user's field of view. Exemplary reflectors that may serve as static reflectors 131 include, without limitation, prismatic structures such as prismatic reflectors and/or prismatic film, parabolic structures, and/or one or more holographic optical element(s). However, in alternative implementations, static reflectors 131 may redirect light signals 111 by refraction and/or by diffraction as opposed to by reflection.

Figure 2:
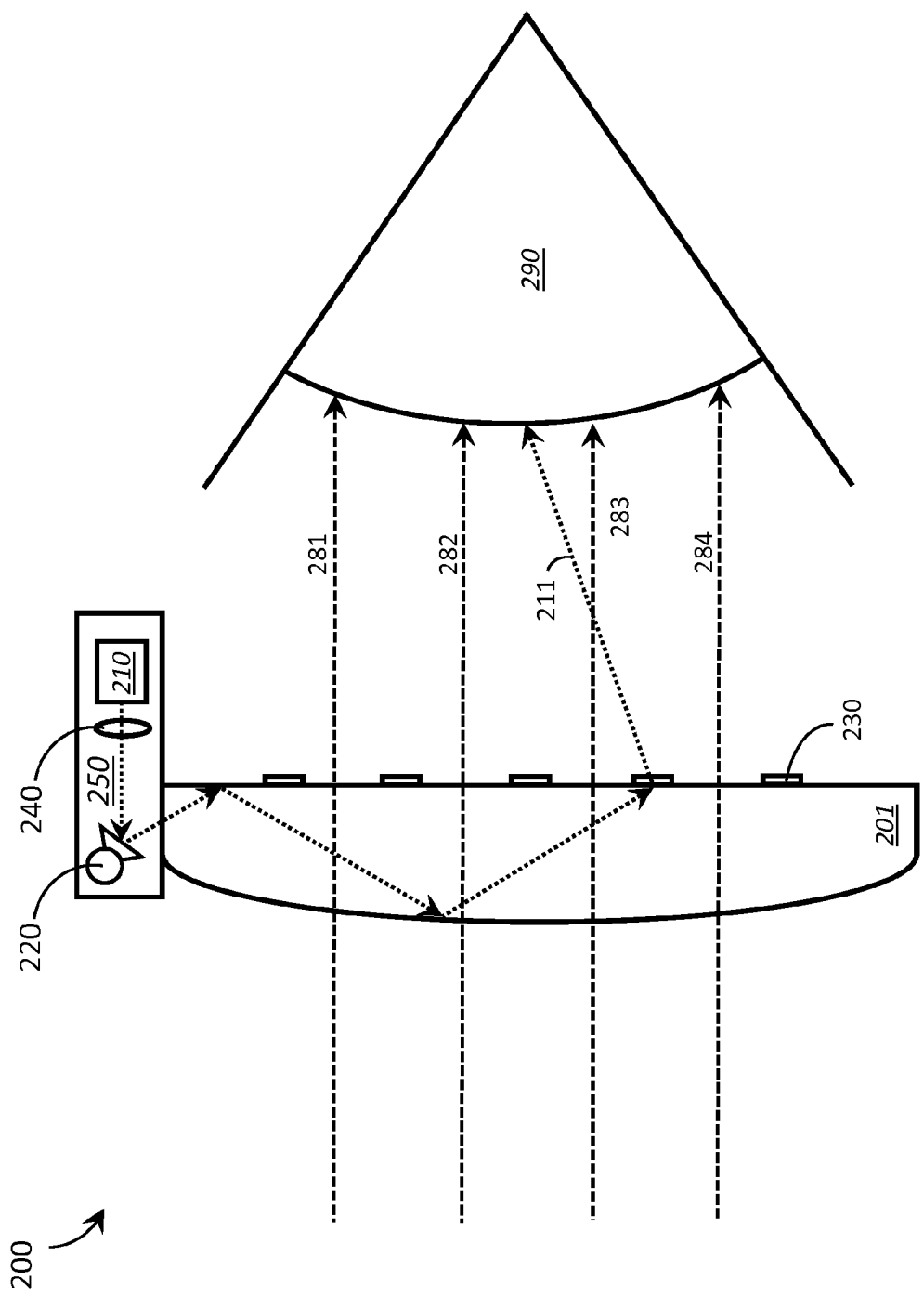
FIG. 2 is an illustrative diagram showing a side view of an alternative configuration for a wearable heads-up display in accordance with the present systems, devices, and methods.

FIG. 2 is an illustrative diagram showing a side view of an alternative configuration for a wearable heads-up display 200 in accordance with the present systems, devices, and methods. Display 200 includes many similar elements to those described for display 100 but arranged in a different configuration. Specifically, display 200 includes a lens 201 physically coupled to a support structure 250, and support structure 250 carries a light source 210, a collimator 240, and a dynamic reflector 220. Furthermore, lens 201 carries a set of static light-redirection elements in the form of static refractors 230. A difference between display 100 and display 200 is now described.

In display 100, dynamic reflector 120 is positioned out-of-plane with respect to lens 101 as previously described. In this out-of-plane configuration, dynamic reflector 120 controllably reflects light signals 111 towards select regions of an outer surface of lens 101 (i.e., towards specific static reflectors 131) without causing the light signals 111 to traverse through any portion of a volume of lens 101. The light signals 111 are then reflected into the user's field of view from static reflectors 130 without entering or passing through lens 101. By comparison, in display 200 dynamic reflector 220 is positioned in-plane with respect to lens 201 (an extension of lens 201 vertically in FIG. 2 would cause lens 201 to contact or traverse dynamic reflector 220). In this configuration, dynamic reflector 220 reflects light signals 211 into a volume of lens 201. Each light signal 211 is totally internally reflected within lens 201 until the light signal 211 impinges on a point on an inner surface of lens 201 that aligns with a corresponding static light-redirection element 230 on an outer surface of lens 201. The static light-redirection elements 230 of display 200 are static refractors 230 and when a light signal 211 impinges on an inner surface of lens 201 that aligns with a corresponding static refractor 230 on an outer surface of lens 201, the light signal 211 is refracted out of the volume of lens 201 (i.e., the light signal 211 ceases to be totally internally reflected) and redirected into the user's eye 290/field of view. Specific static refractors 230 are selected by respective rotational orientations of dynamic reflector 220 that cause the totally internally reflected (i.e., within lens 201) path of light signals 211 to impinge upon respective ones of static refractors 230. Exemplary refractors that may serve as static refractors 230 include, without limitation, prismatic structures such as prismatic refractors and/or prismatic film and/or holographic optical elements. FIG. 2 also depicts environment light 281, 282, 283, and 284 passing through lens 201 unaffected by refractors 230 into the user's eye 290.

In both exemplary display 100 and exemplary display 200, static light-redirection elements 130 and 230 (i.e., static reflectors 130 and static refractors 230) are depicted as discrete, spatially separated elements. This depiction is for ease of illustration only and facilitates, for example, the depiction of external light 181, 182, 183, 184, 281, 282, 283, and 284 passing through lenses 101 and 201 substantially unaffected. In practice, static light-redirection elements 130/230 may comprise elements and/or regions that are distributed substantially uniformly and/or continuously over respective portions of the areas of lenses 101/201.

In both exemplary display 100 and exemplary display 200, light source 110, 210 and dynamic reflector 120, 220 may be implemented in a variety of different configurations. Two exemplary configurations are provided in FIG. 3 and FIG. 4, respectively.

Figure 3:
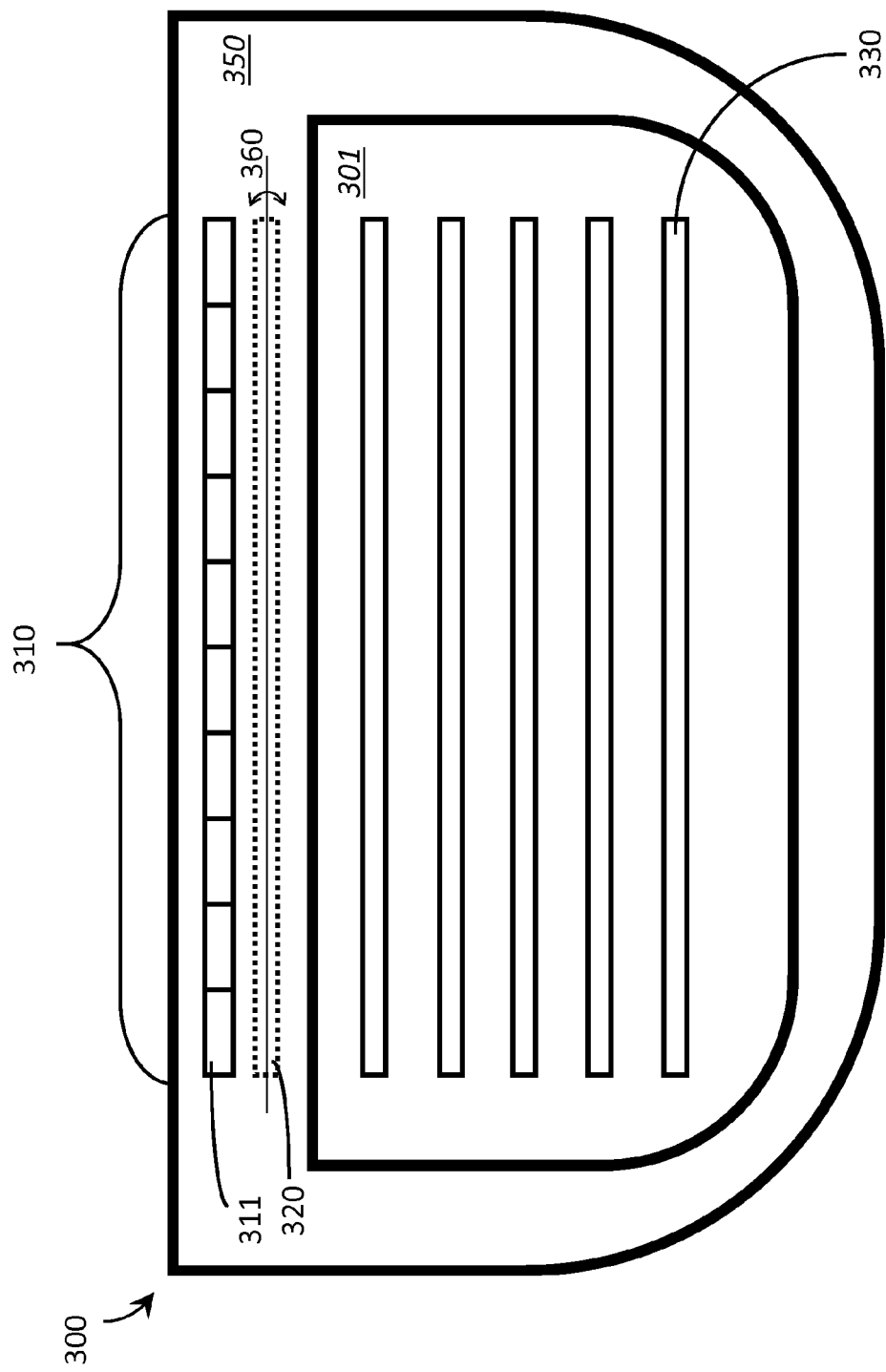
FIG. 3 is an illustrative diagram showing a front view of a wearable heads-up display in accordance with the present systems, devices, and methods.

FIG. 3 is an illustrative diagram showing a front view of a wearable heads-up display 300 in accordance with the present systems, devices, and methods. For the purposes of FIG. 3, display 300 may be substantially similar to either display 100 from FIG. 1 or display 200 from FIG. 2. Display 300 includes a lens (i.e., a "transparent element") 301 carried by a support structure 350, and a set of static light-redirection elements 330 carried by or proximate lens 301 in the user's field of view. Static light-redirection elements 330 may be reflective elements (similar to elements 131 from display 100, including holographic optical elements) or refractive elements (similar to elements 230 from display 200), and may or may not be applied as a thin film to a surface of lens 301. Static light-redirection elements 330 are depicted in FIG. 3 as discrete, spatially-separated strips/rows with significant gaps therebetween; however, as described for FIGS. 1 and 2 this depiction is for ease of illustration only. In practice, static light-redirection elements 330 may comprise elements and/or regions that are distributed substantially uniformly and/or continuously over at least a portion of the area of lens 301 (i.e., with or without gaps therebetween). For the purposes of FIG. 3, the five row-like static light-redirection elements 330 (only one called out in the Figure to reduce cluster) illustrated may be interpreted as a subset of all of the static light-redirection elements carried by (or proximate) lens 301.

Display 300 also includes a light source 310 and a dynamic reflector 320. In the exemplary implementation of display 300, light source 310 comprises a set, row, or "register" of light-emitting diodes 311 (including, in some implementations, organic light-emitting diodes or "OLEDs") that, in use, may each correspond to a respective pixel from a row of an image and the image may be accordingly scanned on a row-by-row basis as taught in U.S. Provisional Patent Application Ser. No. 61/928,568 (now U.S. Non-Provisional patent application Ser. No. 14/599, 279). With light source 310 comprising a register of LEDs 311, dynamic reflector 320 in display 300 comprises an elongated reflective strip 320 that is controllably rotatable about (e.g., rotationally or pivotally mounted for rotation or pivoting about, and/or deformable about) an axis 360 that is parallel to or collinear with the longitudinal axis of reflector 320. In some implementations, reflector 320 may comprise one or more micromirror device(s) that is/are controllably rotatable in one rotational dimension. For example, reflector 320 may comprise a single elongated reflective bar-like micromirror that is controllably rotatable in one rotational dimension about an axis that is parallel to or collinear with the longitudinal axis thereof, or reflector 320 may comprise a "register" of individual micromirror devices arranged in a row/strip and each controllably rotatable about a shared axis that is parallel to or collinear with the longitudinal axes thereof.

Figure 4:
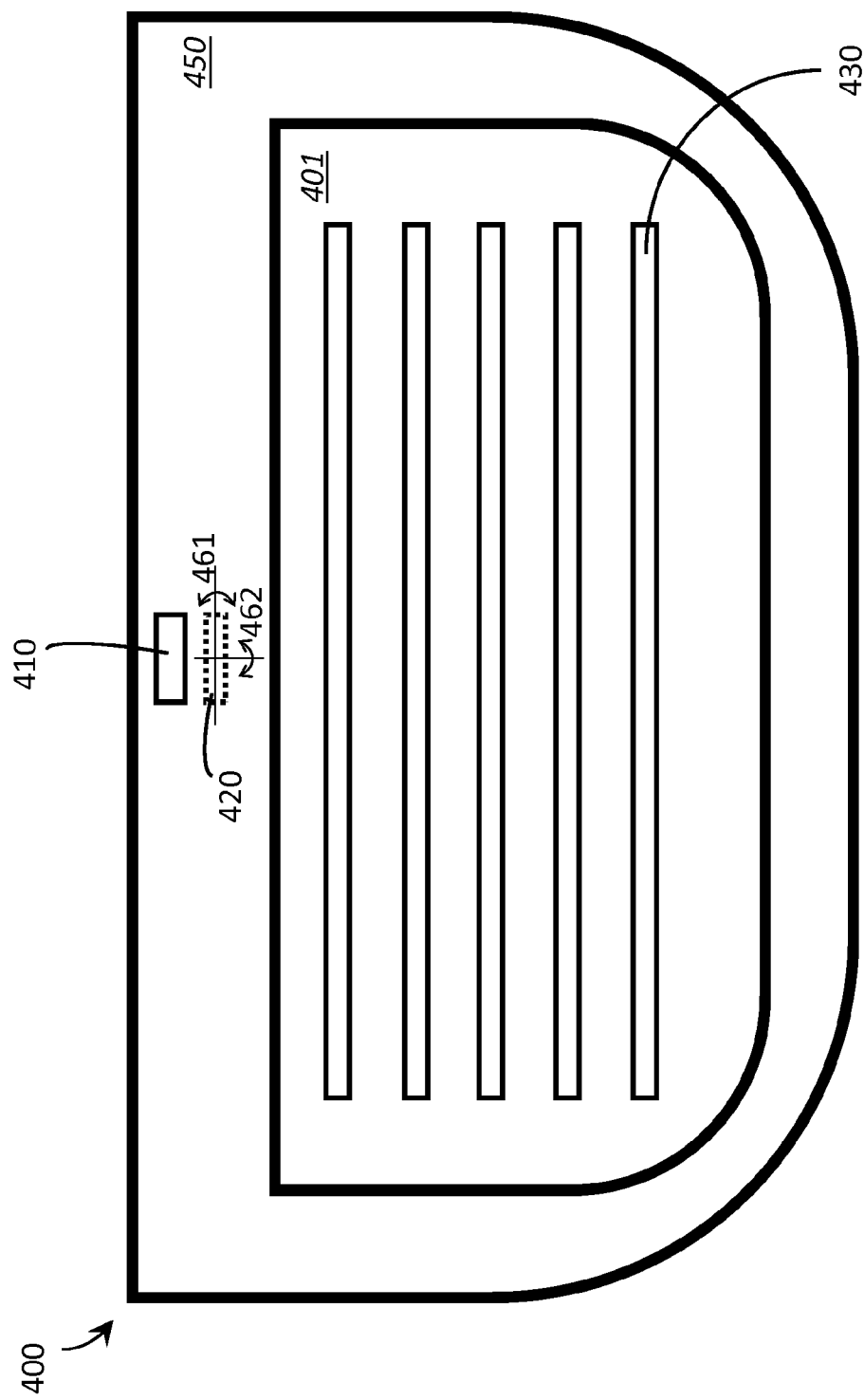
FIG. 4 is an illustrative diagram showing a front view of a wearable heads-up display in accordance with the present systems, devices, and methods.

In display 300, both register of LEDs 310 and elongated reflective strip 320 are depicted as respective rows that span a width (i.e., a portion of the total width) of lens 301. This configuration is due, at least in part, to the placement of LEDS 310 and strip 320 above lens 301. That is, register of LEDs 310 and elongated reflective strip 320 are carried on support frame 350 above lens 301 to be at (or beyond) the periphery of the top of the user's field of view. As previously described, in alternative configurations register of LEDs 310 and elongated reflective strip 320 may be carried at a side of lens 301 to be at (or beyond) the periphery of a side of the user's field of view. In such configurations, register of LEDs 310 and elongated reflective strip 320 may both be arranged in a column configuration as opposed to a row configuration and accordingly span a height (i.e., a portion of the total height) of lens 301. FIG. 4 is an illustrative diagram showing a front view of a wearable heads-up display 400 in accordance with the present systems, devices, and methods. For the purposes of FIG. 4, display 400 may be substantially similar to either display 100 from FIG. 1 or display 200 from FIG. 2. Display 400 includes a lens 401 carried by a support structure 450, and a set of static light-redirection elements 430 carried by or proximate lens 401 in the user's field of view. Static light-redirection elements 430 may be reflective elements (similar to elements 131 from display 100, including holographic optical elements) or refractive elements (similar to elements 230 from display 200), and may or may not be applied as a thin film to a surface of lens 401. Display 400 also includes a light source 410 and a dynamic (e.g., rotationally or pivotally mounted for rotation or pivoting, and/or deformable) reflector 420. In the exemplary implementation of display 400, light source 410 comprises a laser (e.g., a monochromatic laser or an RGB laser) that, in use, may generate and emit individual portions of an image and the image may be accordingly scanned (e.g., on a pixel-by-pixel basis, on a row-by-row basis, on a column-by-column basis, or otherwise) as taught in U.S. Provisional Patent Application Ser. No. 61/928,568 (now U.S. Non-Provisional patent application Ser. No. 14/599,279). With light source 410 comprising a point-source laser, dynamic reflector 420 in display 400 comprises a reflector that is controllably rotatable about at least two orthogonal axes 461 and 462. In some implementations, reflector 420 may comprise a micromirror device that is controllably rotatable in at least two rotational dimensions.

In both display 300 and display 400, the light source 310, 410 and the dynamic reflector 320, 420 are depicted on the portion of the support structure 350, 450 that forms the perimeter of the lens 301, 401, and specifically, at the "top" of the lens 301, 401. This configuration is used for illustrative purposes only and in alternative implementations either or both of a light source and dynamic reflector may be positioned at a side of bottom of a lens and/or on an arm of a support structure.

Dynamic reflectors 320 and 420 are shown in dashed lines in FIGS. 3 and 4, respectively, to indicate that dynamic reflectors 320 and 420 are at a different depth than light sources 310, 410 (i.e., either above or beneath the page) in the illustrated embodiment.

Aspects of the various configurations depicted in FIGS. 1, 2, 3, and 4 may be combined to produce further configurations of the present systems, devices, and methods.

FIGS. 5A through 5K provide an illustrative example of how the wearable heads-up displays described herein may be used to display an image in the same field of view as light from external sources. FIGS. 5A through 5K implement transparent displays that are substantially similar to displays 100 and 300 from FIGS. 1 and 3, respectively, though displays that implement the configuration(s) of displays 200 and/or 400, or other configurations consistent with the descriptions herein, may similarly be employed.

FIGS. 5A and 5B are illustrative diagrams showing a side view and a front view, respectively, of a wearable heads-up display 500 in a first stage of an exemplary use in accordance with the present systems, devices, and methods. In the first stage of the exemplary use, a light source (e.g., a register of LEDs) 510 generates and emits a first set of light signals that together represent a first (i.e., topmost) row (e.g., row of pixels) of an image. The first set of light signals are transmitted through collimators 540 and the resulting parallel beams are directed towards dynamic reflector (e.g., an elongated reflective strip) 520. Since the first set of light signals correspond to the topmost row (e.g., row of pixels) of the image, the dynamic reflector 520 is positioned in a first rotational orientation to reflect the light signals towards a first subset (i.e., the topmost row) of static reflectors 530 on a surface of lens 501. Light from external sources passes through lens 501 to allow the user to see through the display 500 while light from light source 510 is directed into the user's field of view from first row of static reflectors 530.

FIGS. 5C and 5D are illustrative diagrams showing a side view and a front view, respectively, of display 500 in a second stage of the exemplary use in accordance with the present systems, devices, and methods. In the second stage of the exemplary use, light source 510 generates and emits a second set of light signals that together represent a second row (e.g., row of pixels) of an image. The second set of light signals are transmitted through collimators 540 and the resulting parallel beams are directed towards dynamic reflector 520. Since the second set of light signals correspond to the second row (e.g., row of pixels) of the image, the dynamic reflector 520 is positioned in a second rotational orientation to reflect the light signals towards a second subset (i.e., the second row) of static reflectors 530 on a surface of lens 501. Light from external sources passes through lens 501 to allow the user to see through the display 500 while light from light source 510 is directed into the user's field of view from second row of static reflectors 530.

FIGS. 5E and 5F are illustrative diagrams showing a side view and a front view, respectively, of display 500 in a third stage of the exemplary use in accordance with the present systems, devices, and methods. In the third stage of the exemplary use, light source 510 generates and emits a third set of light signals that together represent a third row (e.g., row of pixels) of an image. The third set of light signals are transmitted through collimators 540 and the resulting parallel beams are directed towards dynamic reflector 520. Since the third set of light signals correspond to the third row (e.g., row of pixels) of the image, the dynamic reflector 520 is positioned in a third rotational orientation to reflect the light signals towards a third subset (i.e., the third row) of static reflectors 530 on a surface of lens 501. Light from external sources passes through lens 501 to allow the user to see through the display 500 while light from light source 510 is directed into the user's field of view from third row of static reflectors 530.

FIGS. 5G and 5H are illustrative diagrams showing a side view and a front view, respectively, of display 500 in a fourth stage of the exemplary use in accordance with the present systems, devices, and methods. In the fourth stage of the exemplary use, light source 510 generates and emits a fourth set of light signals that together represent a fourth row (e.g., row of pixels) of an image. The fourth set of light signals are transmitted through collimators 540 and the resulting parallel beams are directed towards dynamic reflector 520. Since the fourth set of light signals correspond to the fourth row (e.g., row of pixels) of the image, the dynamic reflector 520 is positioned in a fourth rotational orientation to reflect the light signals towards a fourth subset (i.e., the fourth row) of static reflectors 530 on a surface of lens 501. Light from external sources passes through lens 501 to allow the user to see through the display 500 while light from light source 510 is directed into the user's field of view from fourth row of static reflectors 530.

Figures 5I, 5J:
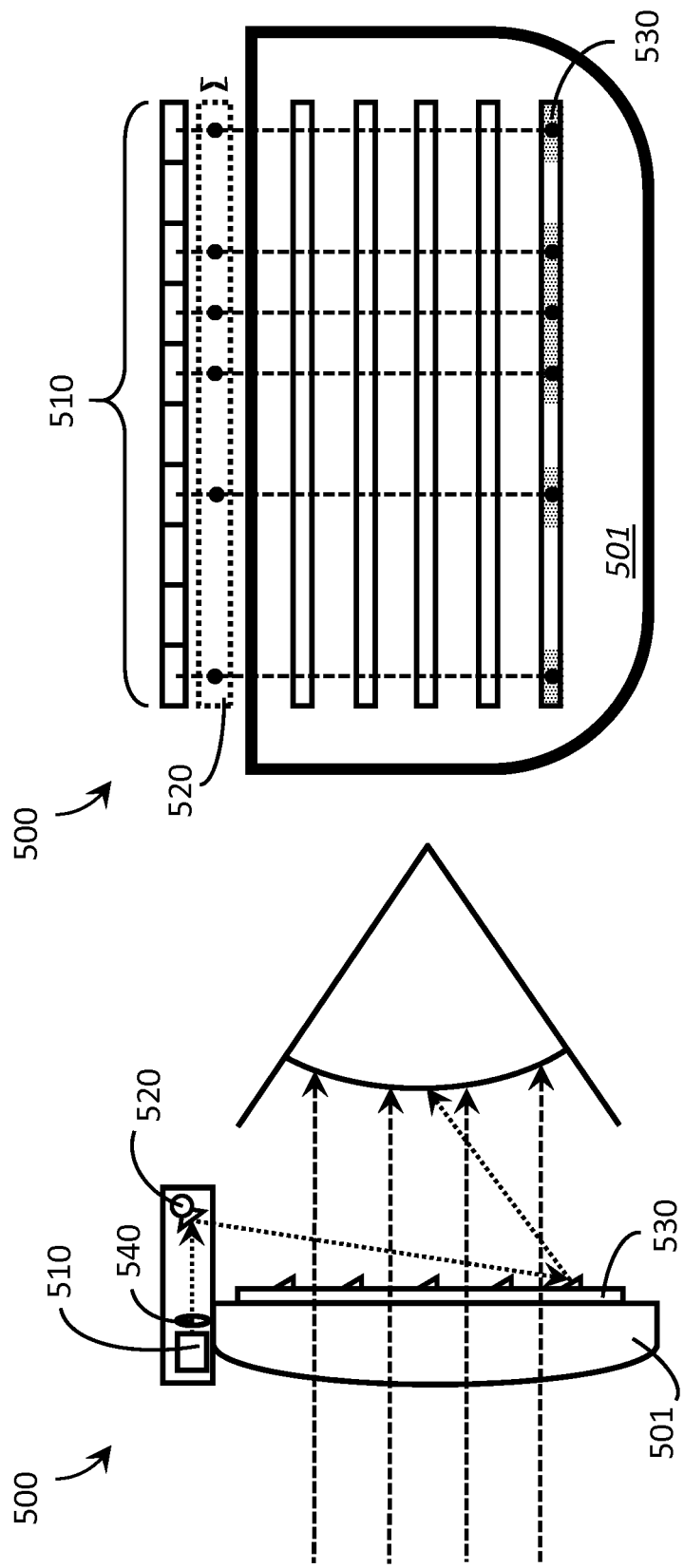
FIG. 5I is an illustrative diagram showing a side view of a wearable heads-up display in a fifth stage of the exemplary use in accordance with the present systems, devices, and methods.
FIG. 5J is an illustrative diagram showing a front view of a wearable heads-up display in the fifth stage of the exemplary use in accordance with the present systems, devices, and methods.

FIGS. 5I and 5J are illustrative diagrams showing a side view and a front view, respectively, of display 500 in a fifth stage of the exemplary use in accordance with the present systems, devices, and methods. In the fifth stage of the exemplary use, light source 510 generates and emits a fifth set of light signals that together represent a fifth row (e.g., row of pixels) of an image. The fifth set of light signals are transmitted through collimators 540 and the resulting parallel beams are directed towards dynamic reflector 520. Since the fifth set of light signals correspond to the fifth row (e.g., row of pixels) of the image, the dynamic reflector 520 is positioned in a fifth rotational orientation to reflect the light signals towards a fifth subset (i.e., the fifth row) of static reflectors 530 on a surface of lens 501. Light from external sources passes through lens 501 to allow the user to see through the display 500 while light from light source 510 is directed into the user's field of view from fifth row of static reflectors 530.

Figure 5K:
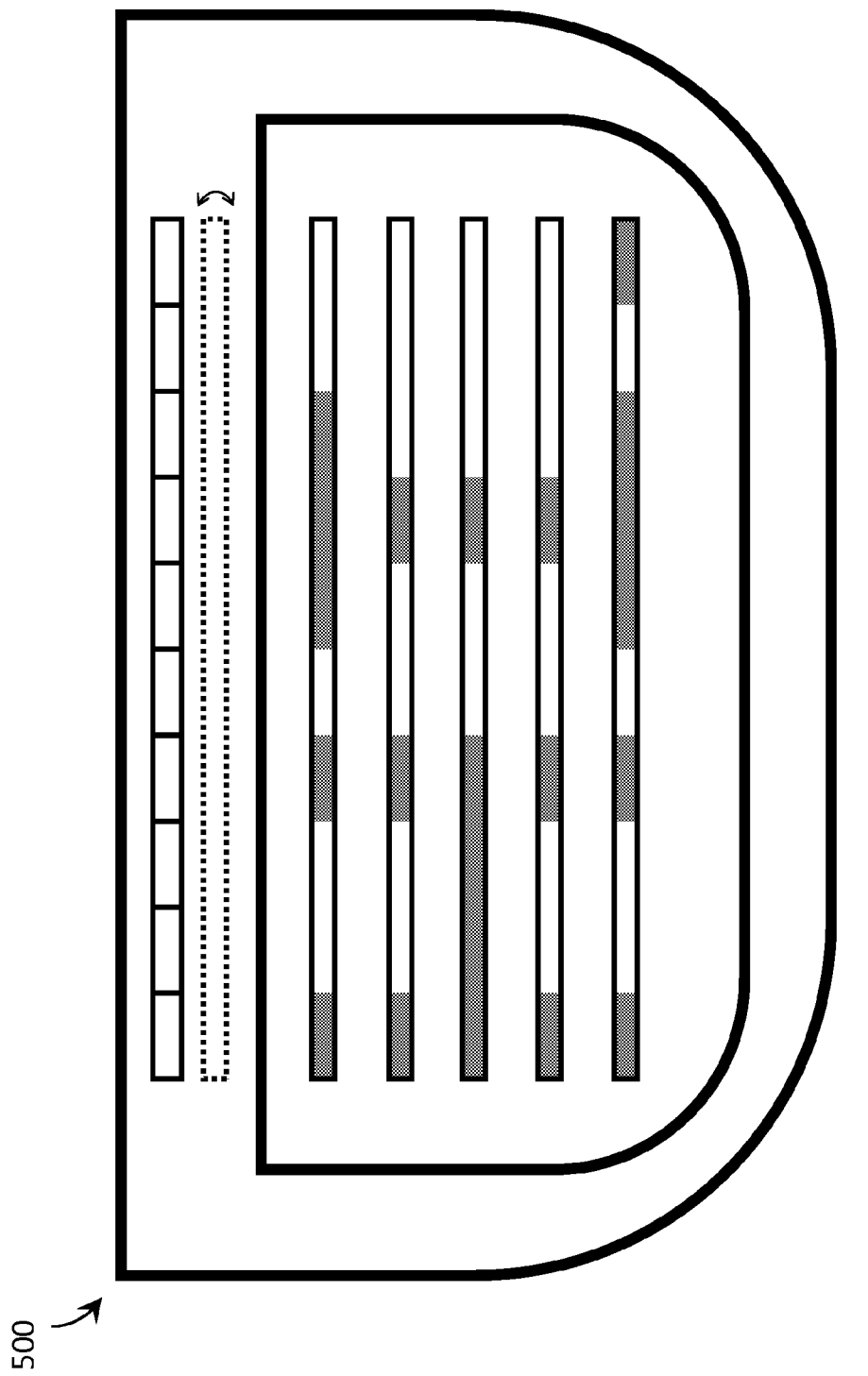
FIG. 5K is an illustrative diagram showing a front view of a wearable heads-up display and summarizing the cumulative effect of the exemplary use in accordance with the present systems, devices, and methods.

FIG. 5K is an illustrative diagram showing a front view (from the user's point of view) of display 500 and summarizing the cumulative effect of the exemplary use in accordance with the present systems, devices, and methods. In accordance with the present systems, devices, and methods, the light signals from light source 510 and/or the rotational orientation of dynamic reflector 520 may be substantially simultaneously switched, varied, cycled, modulated, or otherwise changed with sufficient rapidity (e.g., at a frequency on the order of hundreds of Hz, kHz, or even MHz) such that the user's eye does not detect the latency between receiving the light signals corresponding to the first row (e.g., row of pixels), as per FIGS. 5A and 5B, and receiving the light signals corresponding to the last row (e.g., last row of pixels), as per FIGS. 5I and 5J. The user sees a single cumulative image that projects upon, overlays, or otherwise shares the field of view with imagery from external sources and, in some implementations, may be tuned to exhibit varying degrees of transparency or opacity (e.g., by changing the frequency at which the elements are switched). FIG. 5K demonstrates that the cumulative effect of the successive portions of an image referenced in the exemplary use depicted in FIGS. 5A through 5J is an image of the word "HI." presented on display 500. As previously described, the image "HI." appears in decoupled row-like segments for ease of illustration only (i.e., because only a spatially separated subset of static reflectors 530 are illustrated in display 500), whereas in practice the pixels/rows of the image "HI." may be more tightly packed together and generally appears continuous without gaps in between.

The exemplary use depicted in FIGS. 5A through 5K implements a row or register of light sources 510 that generate and emit the pixels of the image one complete row at a time. This is similar to the architecture described in FIG. 3 and makes use of an elongated reflective strip dynamic reflector (e.g., 320) that is rotatable along a single axis. In accordance with the present systems, devices, and methods, a single point source (such as a single LED or a laser) may be used as a light source that generates and emits the pixels of the image one pixel at a time. This is similar to the architecture described in FIG. 4 and makes use of a dynamic reflector that is rotatable about at least two axes (i.e., in order to scan across the width and up and down the height of display 500).

The wearable heads-up displays described herein may be used to display static or dynamic content (at virtually any resolution), including without limitation: text, images, notifications, maps, videos, menus, gauges, and/or dynamic user interfaces. As an example, 1080p video having a frame rate of 24 fps with a 16:9 aspect ratio may be presented by a display taught herein with a set of static light-redirection elements (e.g., 130, 230, 330, 430, and/or 530) having 1080 rows, a light source having 1920 individual light-emitting diodes (e.g., 311), and with both the dynamic reflector (120, 220, 320, 420, and/or 520) and the light source (e.g., 110, 210, 310, 410, and/or 510) being capable of switching at a rate of about 26 kHz (i.e., 1080 rows multiplied by 24 frames). Such is entirely feasible using, for example OLED technology for light sources 311 and a microelectromechanical system (MEMS) based micromirror (e.g., digital micromirror) for the dynamic reflector (120, 220, 320, 420, and/or 520).

The transparent displays described herein may be used in applications outside of the space of wearable heads-up displays (e.g., as televisions, monitors, and the like) or in more specialized applications such as window display screens. In applications where a transparent display is typically viewed from a distance (e.g., on the order of meters) the collimators described may not be necessary. However, with the use of collimators, the transparent displays described herein are particularly well-suited for use in wearable heads-up display devices and other forms of near-eye displays. In such devices, a single transparent display may be positioned in the field of view of one eye of the user while no transparent display is positioned in the field of view of the other eye of the user (i.e., a monocular configuration), or a single transparent display may be positioned in (and span) the fields of views of both eyes of the user, or a first transparent display (e.g., 100, 200, 300, 400, or 500) may be positioned in the field of view of a first eye of the user and a second transparent display (e.g., 100, 200, 300, 400, or 500) may be positioned in the field of view of a second eye of the user to provide binocular viewing. In the latter case, the second transparent display may essentially duplicate the first transparent display, with or without stereoscopic adjustment as desired.

Figure 6:
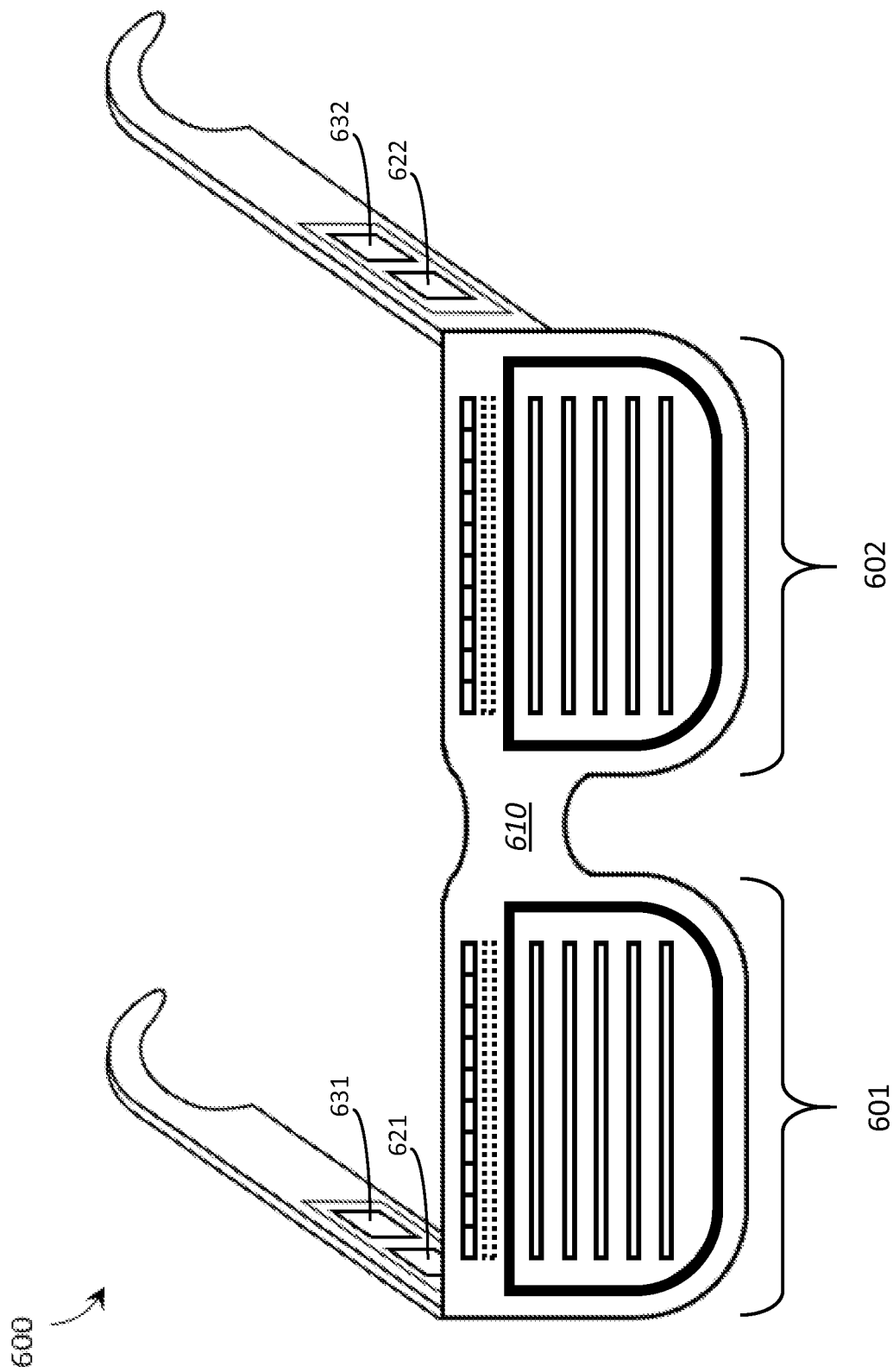
FIG. 6 is a perspective view of an exemplary wearable heads-up display employing two transparent display elements in accordance with the present systems, devices, and methods.

FIG. 6 is a perspective view of an exemplary wearable heads-up display 600 employing two transparent displays 601, 602 in accordance with an implementation of the present systems, devices, and methods. Each of displays 601, 602 may be substantially similar to any of displays 100, 200, 300, 400, or 500 described previously. Wearable heads-up display 600 includes a support structure 610 having the general shape and appearance of a set of eyeglasses or sunglasses and that, in use, is worn on a head of a user so that first display 601 is positioned within a field of view of a first eye of the user and second display 602 is positioned within a field of view of a second eye of the user. When worn on the head of the user, the first and second light sources (not called out in FIG. 6 to reduce clutter, but illustrated in the same way as in FIG. 3) and the first and second dynamic reflectors (also not called out in the Figure to reduce clutter) respectively corresponding to first and second displays 601 and 602 are preferably positioned near or beyond a periphery of the field of view of the corresponding eye of the user. First and second sets of static light-redirection elements (also not called out in FIG. 6 to reduce clutter) are positioned on or proximate transparent elements in displays 601 and 602, respectively, within the field of view with the first and second eye of the user, respectively. As shown in FIG. 6, the respective light sources of each of displays 601 and 602 are positioned near the top of or above the fields of view of the corresponding eyes of the user; however, in alternative implementations one or more light sources may be positioned near the bottom of or below the field of view of at least one eye of the user and/or near a side edge of or beside the field of view of at least one eye of the user, or on respective arms of support structure 610.

In order to control the content displayed on first transparent display 601, wearable heads-up display 600 includes a first processor 621 physically coupled to support structure 610 and communicatively coupled to both the first light source and the first dynamic reflector of first display 601; and a first non-transitory processor-readable storage medium 631 physically coupled to support structure 610 and communicatively coupled to first processor 621. First non-transitory processor-readable storage medium 631 stores processor-executable instructions that, when executed by first processor 621, cause first processor 621 to: control the light provided by the first light source and control an angle/position/orientation of the first dynamic reflector. In some implementations, a single processor and a single non-transitory processor-readable storage medium may control the operations of both first display 601 and second display 602; however, in the illustrated example of FIG. 6, wearable heads-up display 600 includes a second processor 622 and a second non-transitory processor-readable storage medium 632 communicatively coupled thereto for controlling second display 602.

In some applications of wearable heads-up displays 600 that employ two transparent displays 601 and 602, both transparent displays 601 and 602 may simultaneously display visual content to the user. However, in other applications, it may be advantageous to rapidly alternate which of the two displays 601 and 602 is displaying content to the user while the other of displays 602 and 601 is in a state of maximal transparency. For example, in an application in which video is displayed to a user, all odd frames may be displayed on first display 601 while second display 602 is in a state of maximal transparency and all even frames may be displayed on second display 602 while first display 601 is in a state of maximal transparency. This approach can maximize the user's perception of light from external sources without noticeably detracting from the quality of the content displayed on displays 601 and 602. Similar techniques are employed in, for example, shutter-based 3D glasses.

In some applications of a wearable heads-up display, it may be advantageous for displayed content to be projected towards to a specific and limited region of the user's eye such that the displayed content may go in and out of the user's field of view depending on where the user is looking (i.e., the user will see the displayed content only if the user moves his/her pupil into the region where the displayed content is projected). For example, if all of the light signals generated by the wearable heads-up display are generally directed towards the top of the user's eye, then the user may only see the displayed content when the user glances upwards. Conversely, in other applications it may be advantageous for displayed content to remain visible to the user over a wide range of eye positions. In other words, it may be advantageous for the user to be able to see the displayed content regardless of where the user is looking (or, at least, when the user is looking in any of multiple different directions). The range of eye positions over which specific content is visible to the user is generally referred to as the "eyebox." An application in which displayed content is only visible from a single or small range of eye positions has a "small eyebox," and an application in which displayed content is visible from a wide range of eye positions has a "large eyebox."

Figure 7:
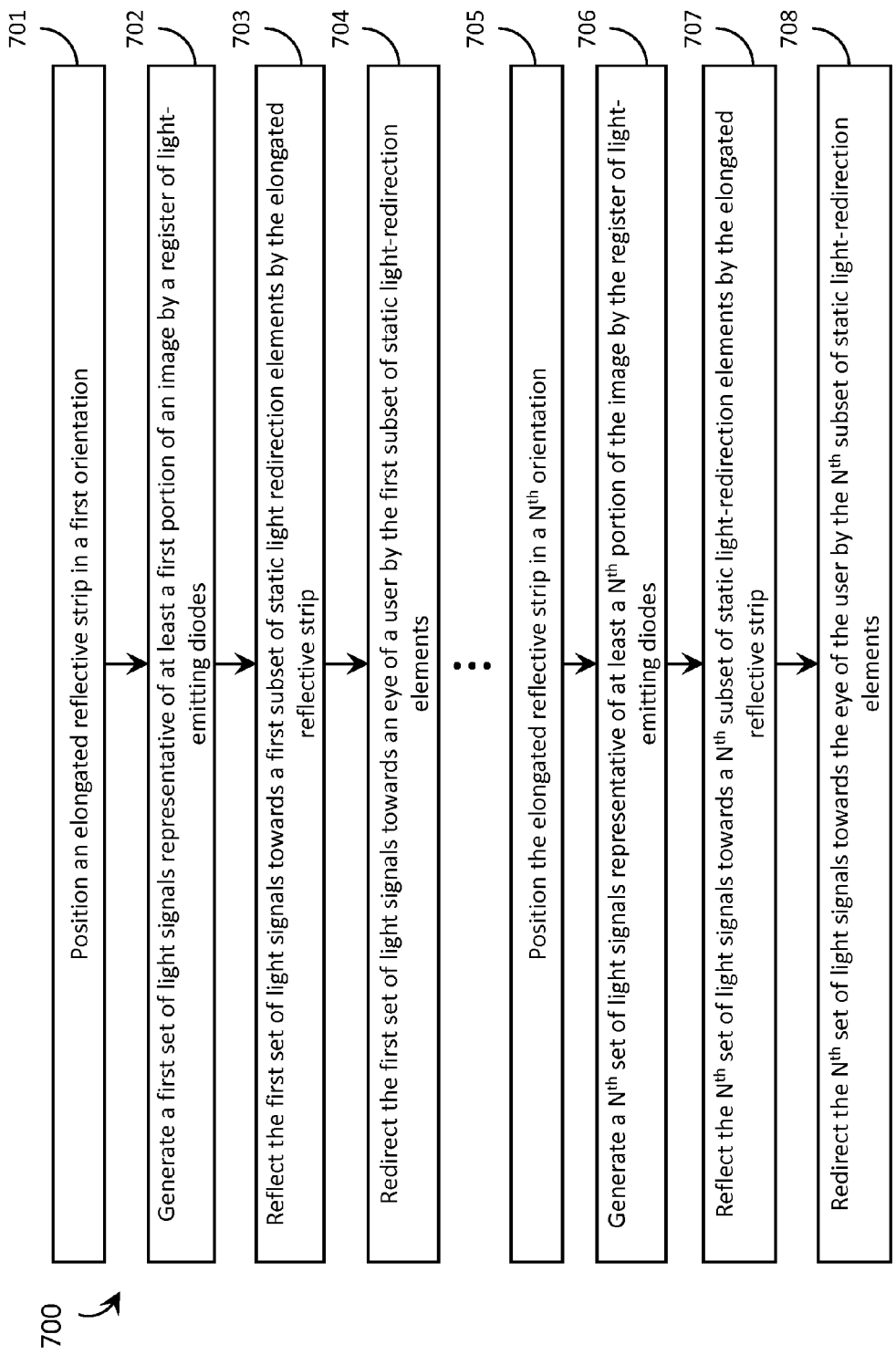
FIG. 7 is a flow-diagram showing a method of operating at least one transparent display element of a wearable heads-up display when the wearable heads-up display is worn on a head of a user in accordance with the present systems, devices, and methods.

FIG. 7 is a flow-diagram showing a method 700 of operating at least one transparent display of a wearable heads-up display when the wearable heads-up display is worn on a head of a user in accordance with the present systems, devices, and methods. Method 700 includes eight illustrated acts 701, 702, 703, 704, 705, 706, 707, and 708, though those of skill in the art will appreciate that in alternative embodiments certain acts may be omitted and/or additional acts may be added. In particular, as described in more details below, one or more repetitions of acts 701, 702, 703, and 704 may be included in between act 704 and 705 for one or more additional light signals representative of one or more additional portion(s) of an image. Those of skill in the art will also appreciate that the illustrated order of the acts is shown for exemplary purposes only and may change in alternative embodiments. For the purpose of method 700, the term "user" refers to a person that is wearing the wearable heads-up display (e.g., 600).

At 701, a dynamic reflector (e.g., 120, 220, 320, 420, or 520), and in the exemplary implementation of method 700, an elongated reflective strip, of the display is positioned in a first orientation (e.g., in a first rotational orientation). The elongated reflective strip may include, for example, one or multiple digital micromirror(s) such as one or multiple MEMS-based micromirror(s) and the positioning of the elongated reflective strip may be controlled by, for example, a processor on-board the wearable heads-up display in response to the processor executing processor-executable instructions stored in a non-transitory processor-readable medium also located on-board the wearable heads-up display. The orientation of the elongated reflective strip may be controllable in a single or multiple rotational dimensions depending on the implementation and the nature of the light source (as described previously, for example, with reference to FIGS. 3 and 4).

At 702, a first light source (e.g., 110, 210, 310, 410, or 510) generates and emits a first set of light signals representative of a first portion of an image. The first light source may include one or more LED(s) and/or OLED(s) of any number of colors arranged in a strip or "register." In alternative implementations, the first light source may include one or more laser device(s)/module(s). If the first light source is arranged in a row and positioned above or below the field of view of the user (e.g., as light source 310 in FIG. 3), then the first portion of the image may include a first row of the image.

At 703, the elongated reflective strip reflects the first set of light signals towards a first subset of static light-redirection elements (e.g., a first subset of static reflectors 130, 330, 430, or 530 or a first subset of static refractors 230) at or proximate a lens of the display. The first subset of static light-redirection elements may be one or more select static light-redirection element(s) of a set of discrete static light-redirection elements or a portion or region of a continuous static light-redirection element. Either way, the first subset of static light-redirection elements is effectively selected by the first orientation of the elongated reflective strip. Depending on the implementation (e.g., display 100 vs. display 200) the elongated reflective strip may reflect the first set of light signals directly towards the first subset of static light-redirection elements without causing the first set of light signals to traverse through any portion of the transparent element (as in display 100) or the elongated reflective strip may reflect the first light signal into a volume of the transparent element where the first set of light signals are totally internally reflected until the first set of light signals impinge on a region of an inner surface of the transparent element that aligns with a corresponding subset of static refractors on an outer surface of the transparent element.

At 704, the first subset of static light-redirection element redirects the first set of light signals towards an eye of the user and into the user's field of view so that the user sees the first set of light signals. Depending on the specific implementation (e.g., display 100 vs. display 200), the first subset of static light-redirection elements may reflect (per display 100) or refract (per display 200) the first set of light signals towards the eye of the user.

Acts 701, 702, 703, and 704 may be repeated sequentially for multiple sets of light signals respectively corresponding to multiple portions of an image. For example, acts 701, 702, 703, and 704 may be repeated for a second set of light signals corresponding to a second portion of the image using a second orientation of the elongated reflective strip and a second subset of static light-redirection elements. When the image includes N portions, where N is an integer greater than 2, method 700 may include, until i=(N+1), where i is an integer with an initial value of 3, sequentially: positioning the elongated reflective strip in an $i^{th}$ orientation; generating an $i^{th}$ set of light signals representative of an $i^{th}$ portion of the image by the at least one light source (e.g., by the register of LEDs); reflecting the $i^{th}$ set of light signals towards an $i^{th}$ subset of static light-redirection elements in the set of static light-redirection elements by the elongated reflective strip, the $i^{th}$ subset of static light-redirection elements determined by the $i^{th}$ orientation of the elongated reflective strip; redirecting the $i^{th}$ set of light signals towards the eye of the user by the $i^{th}$ subset of static light-redirection elements; and incrementing i by 1.

In general, method 700 may include sequentially repeating acts 701, 702, 703, and 704 for successive portions of the image until the $N^{th}$ or final portion of the image is reached. Once the $N^{th}$ or final portion of the image is reached, method 700 may proceed to act 705.

At 705, the elongated reflective strip is positioned in a $N^{th}$ orientation similar to act 701.

At 706, the light source (e.g., the register of LEDs) generates and emits an $N^{th}$ set of light signals representative of at least a $N^{th}$ portion of the image similar to act 702.

At 707, the elongated reflective strip reflects the $N^{th}$ set of light signals towards a $N^{th}$ subset of static light-redirection elements similar to act 703.

At 708, the $N^{th}$ subset of static light-redirection elements redirects (e.g., reflects or refracts depending on the implementation) the $N^{th}$ set of light signals towards the eye of the user similar to act 704.

As previously described, a user may be better able to focus on images displayed on the transparent displays described herein when employed in wearable heads-up displays if the light signals corresponding to the images are directed in substantially parallel beams. To this end, method 700 may include collimating the light signals by at least one collimator and/or the static light-redirection elements (e.g., holographic film, prismatic film, etc.) may be engineered to produce/output substantially collimated light when the light is redirected.

Furthermore, the wearable heads-up display may include a processor and a non-transitory processor-readable storage medium communicatively coupled to the processor that together control at least some of the acts of method 700. For example, method 700 may further include executing, by the processor on-board the wearable heads-up display, processor-executable instructions stored in the non-transitory processor-readable medium to: cause the processor to instruct the at least one light source (e.g., the register of LEDs) to generate and emit the sets of light signals representative of at least a portion of the image per act 702/706; and cause the processor to instruct the elongated reflective strip to adopt the orientation per act 701/705.

Each implementation of a wearable heads-up display described herein may be summarized as including a transparent near-eye display that can be integrated into a wearable display with the form factor of a regular pair of glasses.

The various implementations described herein may optionally include systems, devices, and methods for eye-tracking. In some implementations, the display may be capable (e.g., by using a sufficiently long register of LEDs as a light source and/or by using a sufficiently wide range of rotation for a dynamic reflector) of projecting an image towards the user's eye but over an area that is larger than the user's field of view, and in this case the portion of the total projection area that overlies the area of the user's pupil may be dynamically detected via eye-tracking and the display may dynamically limit projection of the image to be within that dynamic area.

Throughout this specification and the appended claims, reference is often made to "rotating" reflectors (e.g., elongated reflective strips) and reflectors being "oriented" at a particular "angle." A person of skill in the art (e.g., in the art of micromirrors such as digital MEMS-based micromirrors) will appreciate that the concept of "rotation" is used herein as a generalization and that a similar effect may be achieved by a bending or deformation of a micromirror surface.

In some implementations, one or more optical fiber(s) may be used to guide light signals along some of the paths illustrated herein. For example, light may travel from a register of LEDs to a dynamic reflector in displays 100, 200, 300, 400, 500, 600 through one or more optical fiber cable(s).

In some implementations, an elongated reflective strip micromirror used to rotate about a single rotational axis (e.g., reflector 320 from display 300 of FIG. 3) may be fabricated as a set of discrete micromirror-type devices spaced out along a row with a single continuous reflective strip laid over and affixed to their respective upper/top surfaces. Alternatively, an elongated reflective strip may comprise a set or "register" of individual micromirrors, each individual micromirror in the register of micromirrors positioned and aligned to receive and controllably reflect light from a respective one of the LEDs in the register of LEDs.

The wearable heads-up display devices that employ total internal reflection within a transparent lens (e.g., display 200 of FIG. 2) described herein may employ any number of internal reflective bounces inside the lens, including a single reflective bounce or multiple reflective bounces, depending on the relative positions of the dynamic reflector and the static refractor being targeted.

This description includes various non-limiting (unless specifically recited in a claim) examples of light sources generally referred to as "light sources." For example, a row/register of LEDs is described as a light source in display 300 and a laser module is described as a light source in display 400. In accordance with the present systems, devices, and methods, other light sources and/or combinations thereof may be employed in the wearable heads-up displays described herein. As an example, a register of LEDs as used in display 300 may be replaced by the combination of a register of digital micromirrors and a single line-scan laser (i.e., a laser with a lens that spreads the beam of the laser out as a line) oriented so that the line-scan aligns with and shines on the register of micromirrors. Similarly, the register of LEDs in display 300 may be replaced by a register of shutters through which the output of a line-scan laser is selectively/controllably transmitted or blocked depending on the respective state of each shutter in the register of shutters. Another example of a light source that may be used in the present systems, devices, and methods is a "Grating Light Valve" such as that developed by Sony circa 2002.

Throughout this specification and the appended claims, reference is often made to static reflectors/refractors located on or proximate a lens of a wearable heads-up display device. Examples of such static reflectors/refractors include, without limitation, prismatic structures deposited directly on the lens as a thin film (e.g., optical lighting film, or OLF, available from 3G). In accordance with the present systems, devices, and methods, the static reflectors/refractors described herein may serve as "transparent optical combiners" that advantageously direct light corresponding to an image generated by a light source towards the user's eye while simultaneously allowing a majority of external light from the user's environment to pass through with minimal distortion. In general, such combiners may be molded or machined into an existing lens material (e.g., a lens from a user's existing pair of eyeglasses) or formed by a lithography process and deposited onto a surface of a lens (e.g., a lens from a user's existing pair of eyeglasses) as a thin film. If a user's existing pair of eyeglasses is used, then the other elements of the display (e.g., light source, collimator, dynamic reflector, battery, processor, transceiver, etc.) may likewise be added to the support structure(s) of the existing pair of eyeglasses.

The wearable heads-up displays described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

The wearable heads-up displays described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that it is not inconsistent with the specific teachings and definitions herein, U.S. Provisional Patent Application Ser. No. 62/017,089 is incorporated herein by reference, in its entirety. Aspects of the embodiments can be modified, if necessary, to employ systems, circuits and concepts of U.S. Provisional Patent Application Ser. No. 62/017,089 to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
a support structure that in use is worn on a head of a user;
a transparent element that is physically coupled to the support structure, wherein the transparent element is positioned within a field of view of the user when the support structure is worn on the head of the user;
a light source physically coupled to the support structure and positioned near or beyond a periphery of the field of view of the user when the support structure is worn on the head of the user, the light source comprising a register of light-emitting diodes;
a dynamic reflector physically coupled to the support structure and positioned to receive light signals provided by the light source, wherein the dynamic reflector is controllably variable to reflect the light signals provided by the light source towards select regions of the transparent element, the dynamic reflector comprising an elongated reflective strip that is controllably rotatable about an axis that is parallel to or collinear with a longitudinal axis thereof, and wherein the elongated reflective strip is positioned to receive a respective light signal provided by each respective light-emitting diode in the register of light-emitting diodes and reflect the respective light signal provided by each respective light-emitting diode in the register of light-emitting diodes towards a select region of the transparent element that is dependent on a rotational orientation of the elongated reflective strip; and a set of static light-redirection elements, each static light-redirection element in the set of static light-redirection elements positioned on or proximate the transparent element in the field of view of the user when the support structure is worn on the head of the user, wherein in use at least one static light-redirection element in the set of static light-redirection elements receives a light signal reflected by the dynamic reflector and redirects the light signal towards at least one eye of the user.

2. The wearable heads-up display of claim 1, further comprising:
at least one collimator positioned in between the light source and the dynamic reflector, wherein a light signal provided by the light source passes through the at least one collimator before receipt by the dynamic reflector.

3. The wearable heads-up display of clam 1 wherein the transparent element includes a prescription eyeglass lens.

4. The wearable heads-up display of claim 1 wherein each static light-redirection element in the set of static light-redirection elements includes a respective portion of at least one thin-film element that is affixed to the transparent element.

5. The wearable heads-up display of claim 1 wherein each static light-redirection element in the set of static light redirection elements is selected from the group consisting of: a prismatic structure, a prismatic film, a refractive element, a reflector, a parabolic reflector, and a holographic optical element.

6. The wearable heads-up display of claim 1 wherein the transparent element is positioned within a field of view of a first eye of the user when the support structure is worn on the head of the user, and further comprising:
a second transparent element physically coupled to the support structure, wherein the second transparent element is positioned within a field of view of a second eye the user when the support structure is worn on the head of the user;
a second light source physically coupled to the support structure and positioned near or beyond a periphery of the field of view of the second eye of the user when the support structure is worn on the head of the user, the second light source comprising a second register of light-emitting diodes;
a second dynamic reflector physically coupled to the support structure and positioned to receive light signals provided by the second light source, wherein the second dynamic reflector is controllably variable to reflect the light signals provided by the second light source towards select regions of the second transparent element, the second dynamic reflector comprising a second elongated reflective strip that is controllably rotatable about an axis that is parallel to or collinear with a longitudinal axis thereof, and wherein the second elongated reflective strip is positioned to receive a respective light signal provided by each respective light-emitting diode in the second register of light-emitting diodes and reflect the respective light signal provided by each respective light-emitting diode in the second register of light-emitting diodes towards a select region of the second transparent element that is dependent on a rotational orientation of the second elongated reflective strip; and a second set of static light-redirection elements, each static light-redirection element in the second set of static light-redirection elements positioned on or proximate the second transparent element in the field of view of the second eye of the user when the support structure is worn on the head of the user, wherein in use at least one static light-redirection element in the second set of static light-redirection elements receives a light signal reflected by the second dynamic reflector and redirects the light signal towards the second eye of the user.

7. The wearable heads-up display of claim 1 wherein the support structure has a general shape and appearance of an eyeglasses frame.

8. The wearable heads-up display of claim 1, further comprising:
a processor physically coupled to the support structure and communicatively coupled to both the light source and the dynamic reflector; and
a non-transitory processor-readable storage medium physically coupled to the support structure and communicatively coupled to the processor, wherein the non-transitory processor-readable storage medium stores processor-executable instructions that, when executed by the processor, cause the processor to:
control the light signals provided by the light source; and
control the dynamic reflector to reflect the light signals provided by the light source towards select regions of the transparent element.

9. The wearable heads-up display of claim 1 wherein the dynamic reflector is positioned substantially out-of-plane with respect to the transparent element and is controllably variable to reflect the light signals provided by the light source directly towards select regions of transparent element without traversing through any portion of the transparent element, and wherein each static light-redirection element in the set of static light-redirection elements comprises a respective static reflector that receives light signals reflected by the dynamic reflector and reflects the light signals towards at least one eye of the user.

10. The wearable heads-up display of claim 1 wherein the dynamic reflector is positioned substantially in-plane with respect to the transparent element and is controllably variable to reflect the light signals provided by the light source into a volume of the transparent element, each light signal totally internally reflected within the transparent element until the light signal impinges on a region of an inner surface of the transparent element that aligns with a corresponding static light-redirection element on an outer surface of the transparent element, and wherein each static light-redirection element in the set of static light-redirection elements comprises a respective static refractor that receives light signals totally internally reflected within the transparent element and refracts the light signals towards at least one eye of the user.

11. The wearable heads-up display of claim 1 wherein the dynamic reflector comprises a single elongated reflective bar-like micromirror that is controllably rotatable in one rotational dimension about an axis that is parallel to or collinear with a longitudinal axis thereof.

12. The wearable heads-up display of claim 1 wherein the dynamic reflector comprises a register of individual micromirror devices arranged in a strip and each controllably rotatable about a shared axis that is parallel to or collinear with the longitudinal axes thereof.

13. A method of operating a wearable heads-up display when the wearable heads-up display is worn on a head of a user, the wearable heads-up display including a transparent element positioned in a field of view of the user, a light source comprising a register of light-emitting diodes positioned substantially outside of the field of view of the user, a dynamic reflector comprising an elongated reflective strip that is controllably rotatable about an axis that is parallel to or collinear with a longitudinal axis thereof and positioned outside of the field of view of the user, and a set of static light-redirection elements positioned on or proximate the transparent element and within the field of view of the user, the method comprising:
 orienting the elongated reflective strip in a first rotational orientation;
 generating a first set of light signals representative of at least a first portion of an image by the register of light-emitting diodes;
 reflecting the first set of light signals towards a first subset of static light-redirection elements in the set of static light-redirection elements by the elongated reflective strip, the first subset of static light-redirection elements determined by the first rotational orientation of the elongated reflective strip; and
 redirecting the first set of light signals towards an eye of the user by the first subset of static light-redirection elements.

14. The method of claim 13, further comprising:
 orienting the elongated reflective strip in a second rotational orientation;
 generating a second set of light signals representative of a second portion of the image by the register of light-emitting diodes;
 reflecting the second set of light signals towards a second subset of static light-redirection elements in the set of static light-redirection elements by the elongated reflective strip, the second subset of static light-redirection elements determined by the second rotational orientation of the elongated reflective strip; and
 redirecting the second set of light signals towards the eye of the user by the second subset of static light-redirection elements.

15. The method of claim 14 wherein the image includes N portions, where N is an integer greater than 2, the method further comprising:
 until i=(N+1), where i is an integer with an initial value of 3, sequentially:
 orienting the elongated reflective strip in an $i^{th}$ rotational orientation;
 generating an $i^{th}$ set of light signals representative of an $i^{th}$ portion of the image by the register of light-emitting diodes;
 reflecting the $i^{th}$ set of light signals towards an $i^{th}$ subset of static light-redirection elements in the set of static light-redirection elements by the elongated reflective strip, the $i^{th}$ subset of static light-redirection elements determined by the $i^{th}$ rotational orientation of the elongated reflective strip;
 redirecting the $i^{th}$ set of light signals towards the eye of the user by the $i^{th}$ subset of static light-redirection elements; and
 incrementing i by 1.

16. The method of claim 13, further comprising:
 collimating the first set of light signals by at least one collimator.

17. The method of claim 13 wherein the wearable heads-up display includes a processor communicatively coupled to the register of light-emitting diodes and to the elongated reflective strip, and a non-transitory processor-readable storage medium communicatively coupled to the processor, the non-transitory processor-readable storage medium storing processor-executable instructions, and wherein the method further comprises executing the processor-executable instructions by the processor to:
 cause the processor to instruct the register of light-emitting diodes to generate the first set of light signals representative of at least a first portion of the image; and
 cause the processor to instruct the elongated reflective strip to adopt the first rotational orientation.

18. The method of claim 13 wherein the elongated reflective strip is positioned substantially out-of-plane with respect to the transparent element and each static light-redirection element in the set of static light-redirection elements comprises a respective static reflector, and wherein:
 reflecting the first set of light signals towards a first subset of static light-redirection elements in the set of static light-redirection elements by the elongated reflective strip includes reflecting the first set light signals directly towards the first subset of static reflectors by the elongated reflective strip without causing the first set of light signals to traverse through any portion of the transparent element; and
 redirecting the first set of light signals towards an eye of the user by the first subset of static light-redirection elements includes reflecting the first set of light signals towards at least one eye of the user by the set of static reflectors.

19. The method of claim 13 wherein the elongated reflective strip is positioned substantially in-plane with respect to the transparent element and each static light-redirection element in the set of static light-redirection elements comprises a respective static refractor, and wherein:
 reflecting the first set of light signals towards a first subset of static light-redirection elements in the set of static light-redirection elements by the elongated reflective strip includes reflecting the first set of light signals into a volume of the transparent element and totally internally reflecting the first set of light signals within the volume of the transparent element until the first set of light signals impinge on a region of an inner surface of the transparent element that aligns with at least one corresponding static refractor on an outer surface of the transparent element; and
 redirecting the first set of light signals towards an eye of the user by the first subset of static light-redirection elements includes refracting the first set of light signals towards at least one eye of the user by the set of static refractors.

* * * * *